United States Patent [19]
DiSieno et al.

[11] Patent Number: 6,163,913
[45] Date of Patent: Dec. 26, 2000

[54] DOCK LEVELER

[75] Inventors: Thomas M. DiSieno; John J. LeTourneau, both of Athens, N.Y.; Bruce R. Winter, Muskego, Wis.

[73] Assignee: Overhead Door Corporation, Dallas, Tex.

[21] Appl. No.: 09/078,793

[22] Filed: May 14, 1998

Related U.S. Application Data

[63] Continuation of application No. 08/714,853, Sep. 17, 1996, Pat. No. 5,784,740.

[51] Int. Cl.$^7$ ..................................................... E01D 1/00
[52] U.S. Cl. ................................................... 14/71.3
[58] Field of Search ................... 14/71.1, 71.3, 14/71.7

[56] References Cited

U.S. PATENT DOCUMENTS

| | | | |
|---|---|---|---|
| Re. 30,104 | 10/1979 | Burnham | 14/71.3 |
| Re. 30,250 | 4/1980 | Catlett | 14/71.3 |
| 1,106,074 | 8/1914 | Bidlake . | |
| 1,905,947 | 4/1933 | Morgan . | |
| 2,904,802 | 9/1959 | Hartman | 14/71 |
| 3,137,017 | 6/1964 | Pfleger et al. | 14/71 |
| 3,199,133 | 8/1965 | Ramer | 14/71 |
| 3,323,158 | 6/1967 | Loomis | 14/71 |
| 3,327,335 | 6/1967 | Beckwith et al. | 14/71 |
| 3,486,181 | 12/1969 | Hecker, Jr. et al. | 14/71 |
| 3,553,756 | 1/1971 | Hecker, Jr. et al. | 14/71 |
| 3,579,696 | 5/1971 | Hecker, Jr. et al. | 14/71 |
| 3,699,601 | 10/1972 | Hecker, Jr. et al. | 14/71 |
| 3,728,753 | 4/1973 | Beckwith et al. | 14/71 |
| 3,997,932 | 12/1976 | Artzberger | 14/71.3 |
| 4,081,874 | 4/1978 | Artzberger | 14/71.7 |
| 4,091,488 | 5/1978 | Artzberger | 14/71.7 |
| 4,097,949 | 7/1978 | Barrett | 14/71.3 |
| 4,365,374 | 12/1982 | Bennett | 14/71.7 |
| 4,402,100 | 9/1983 | Slusar | 14/71.3 |
| 4,455,703 | 6/1984 | Fromme et al. | 14/71.3 |
| 4,619,008 | 10/1986 | Kovach et al. | 14/71.7 |
| 4,827,549 | 5/1989 | Walker | 14/71.7 |
| 4,928,340 | 5/1990 | Alexander | 14/71.3 |
| 4,937,906 | 7/1990 | Alexander | 14/71.1 |
| 4,977,635 | 12/1990 | Alexander | 14/71.3 |
| 5,097,557 | 3/1992 | Salman et al. | 14/71.1 |
| 5,205,010 | 4/1993 | Hageman | 14/71.7 |
| 5,323,503 | 6/1994 | Springer | 14/71.3 |
| 5,774,920 | 7/1998 | Alexander | 14/71.3 |

*Primary Examiner*—Eileen D. Lillis
*Assistant Examiner*—Gary S. Hartmann
*Attorney, Agent, or Firm*—Akin, Gump, Strauss, Hauer & Feld, L.L.P.

[57] ABSTRACT

A dock leveler includes a pivotally mounted ramp and a lip member pivotally mounted to the distal end of the ramp and moveable between an extended position and a depending position for forming a path between a loading dock and a loadbed of a vehicle. A motor operated linear power screw type actuator is connected to the ramp for moving the ramp to an elevated position and includes an extensible tube member which is engageable with a second tube in telescoped relationship in such a way that the actuator tube may be controlled to be retracted after positioning the ramp to engage the loadbed of a vehicle so that the actuator is not subject to forces exerted by the ramp during oscillatory movement while the vehicle is being loaded or unloaded. In one alternate embodiment the actuator is connected to an intermediate link to allow the pivotal movement of the ramp without exerting damaging forces on the actuator. The lip may be extended by a toggle linkage responsive to movement of the ramp from an elevated position to a declined position in engagement with the loadbed and a latch mechanism is operable to hold the ramp in an extended position until the loadbed is engaged. Ramp support legs are retractable to allow further declining movement of the ramp and are actuatable by a spring connected to a linkage which is moveable to positions to change the direction of spring biasing forces acting to retract and extend the legs.

10 Claims, 17 Drawing Sheets

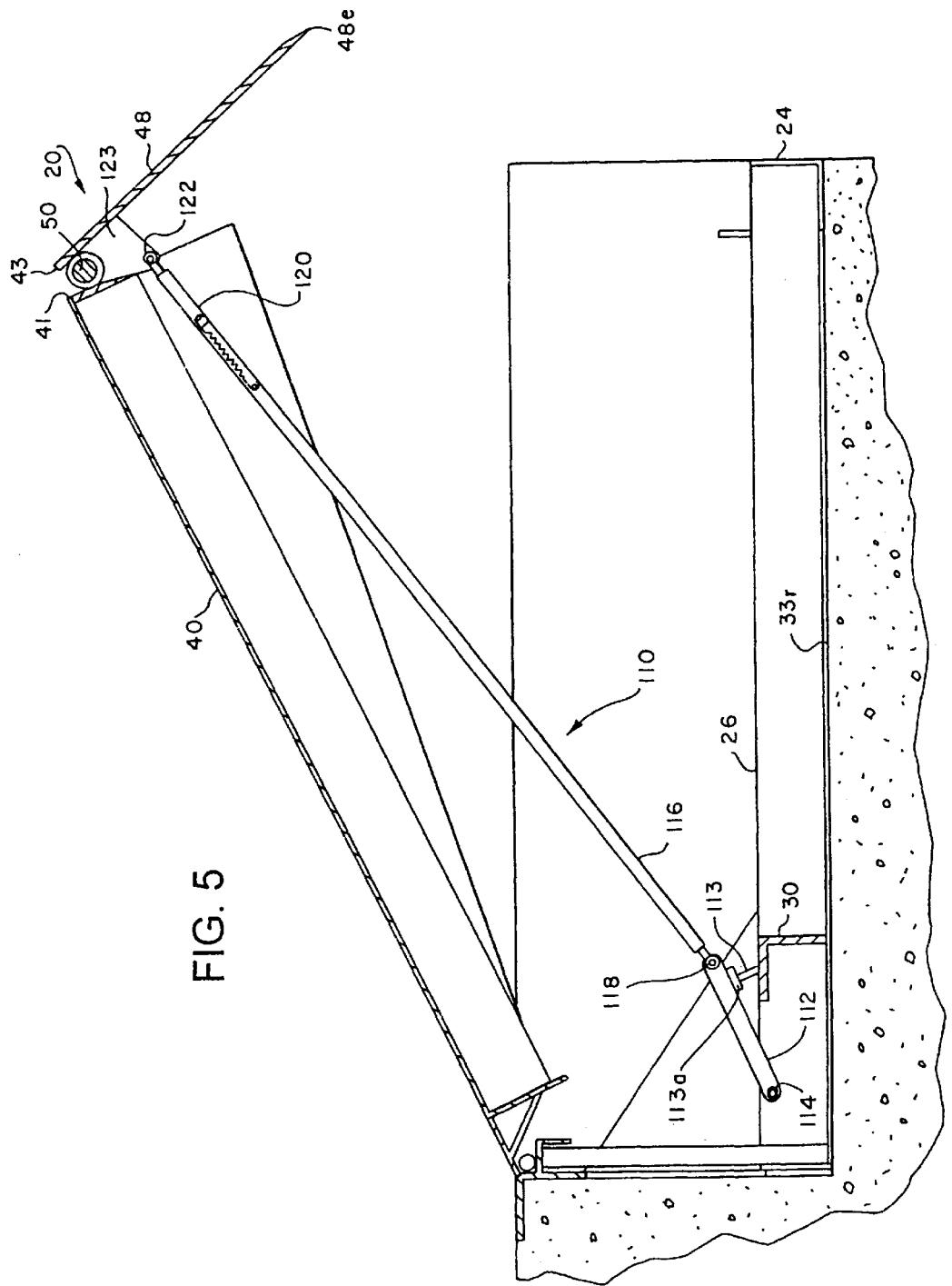

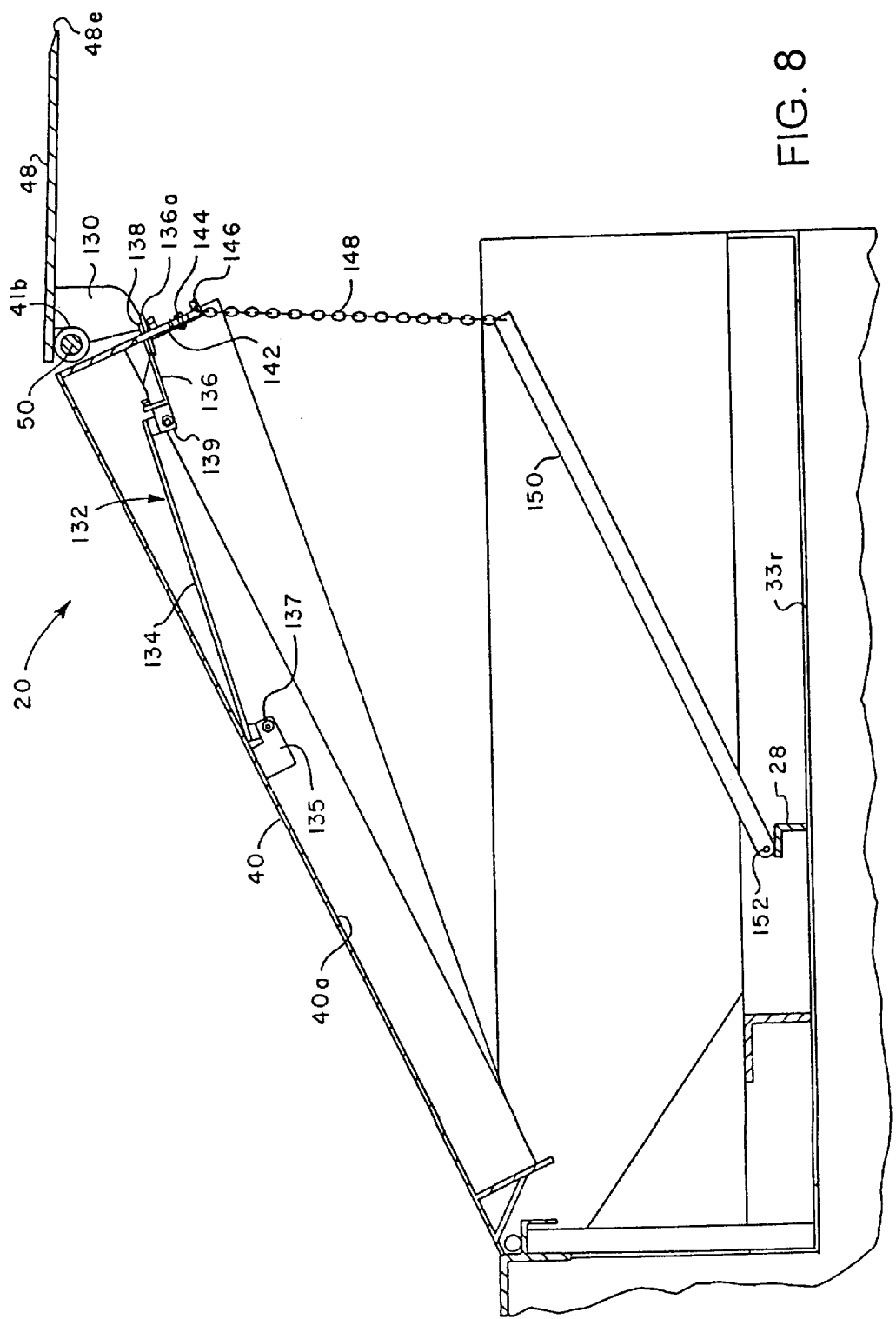

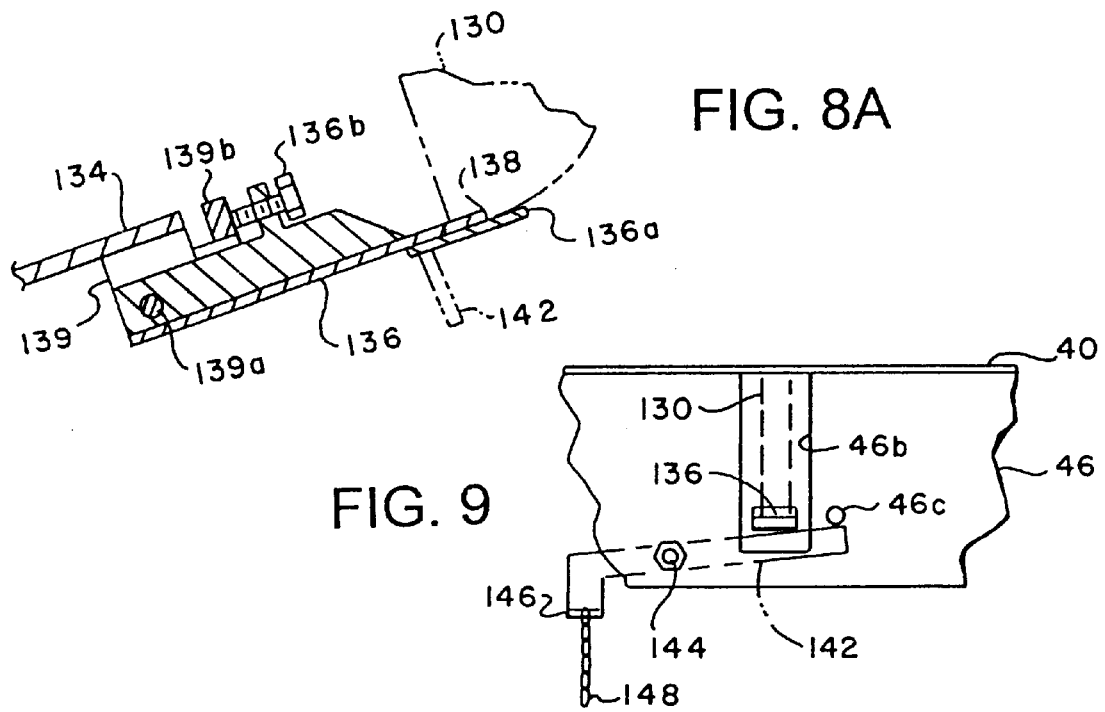
FIG. 8A
FIG. 9
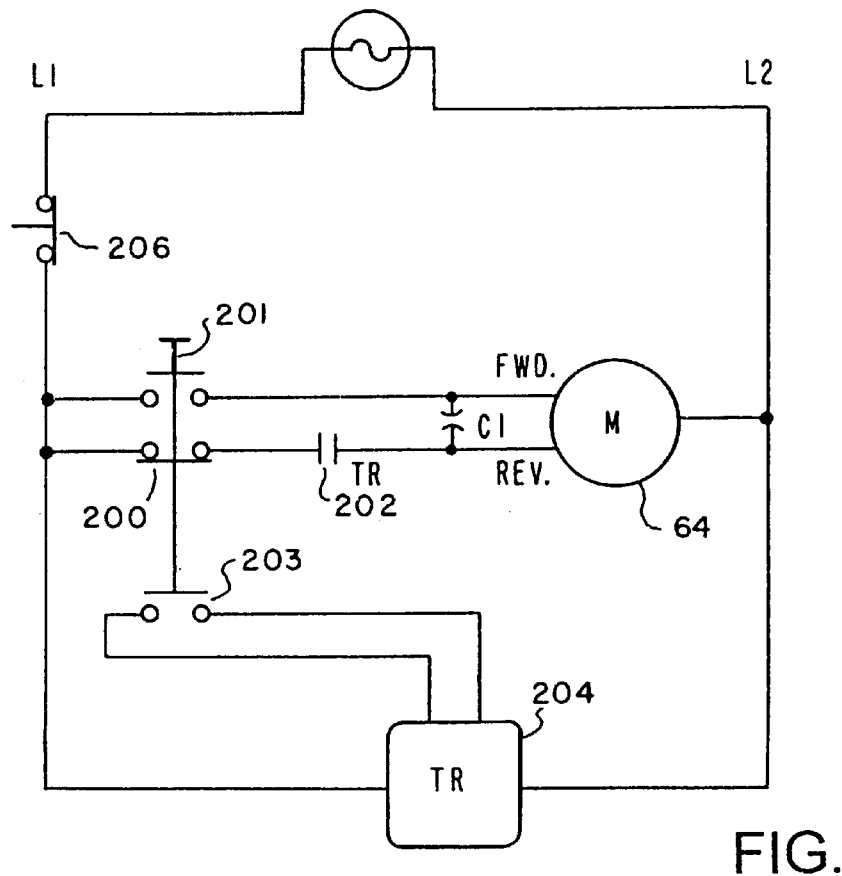
FIG. 12

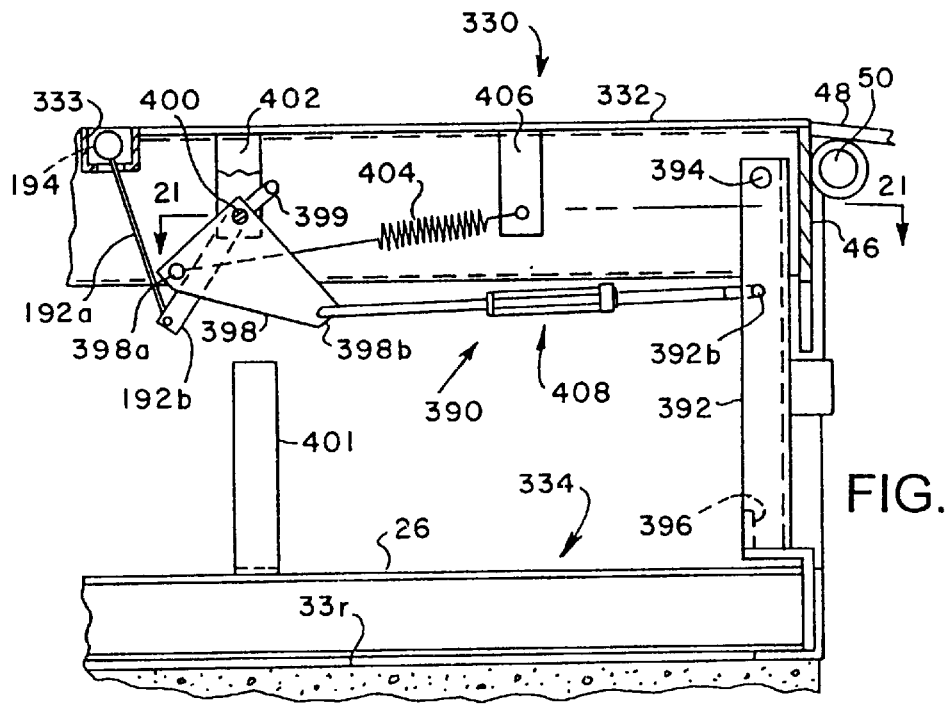
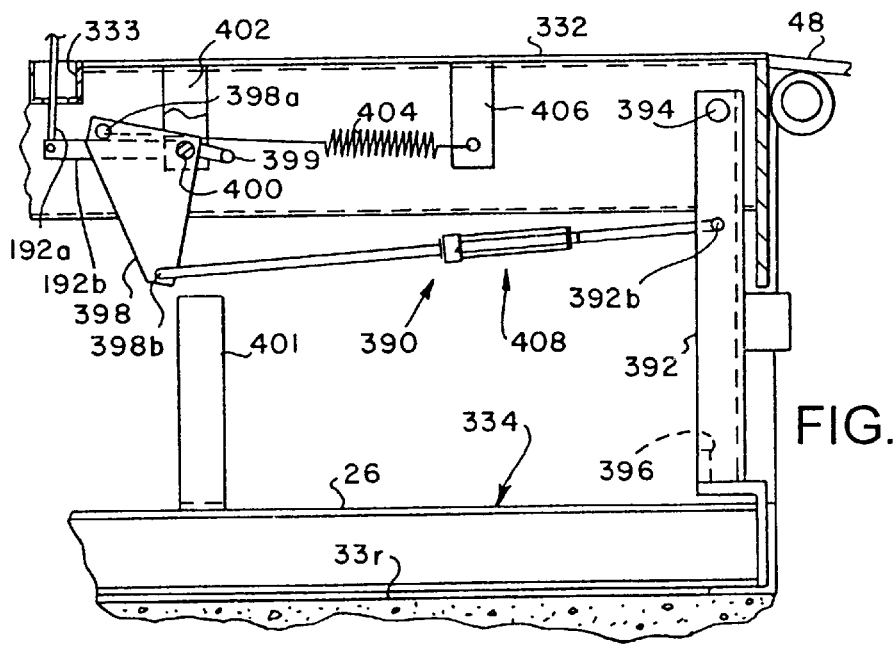

DOCK LEVELER

This application is a continuation of prior application Ser. No. 08/714,853 filed Sep. 17, 1996, now U.S. Pat. No. 5,784,740 issued Jul. 28, 1998.

FIELD OF THE INVENTION

The present invention pertains to a dock leveler apparatus comprising a movable ramp disposed between a loading dock and a vehicle to be loaded or unloaded, and including mechanism for moving the ramp to a working position, minimizing rapid movement of the ramp out of a working position and for actuating and latching a hinged extension lip member of the leveler.

BACKGROUND

Dock levelers comprise, generally, hinged ramp structures which are disposed at vehicle loading docks to provide a ramp extending between a vehicle loadbed and the loading dock to facilitate movement of cargo between the dock and the vehicle and to overcome any difference in elevation between the floor of the vehicle loadbed and the dock. Several dock leveler mechanisms have been developed which provide for movement of the dock leveler from an at rest or stored position to a working position connected to a vehicle loadbed, regardless of the loadbed height relative to the loading dock and the leveler structure, at least within an expected range of heights.

Prior art actuating mechanisms for dock leveler ramps and extension lip members are somewhat complex. Moreover, due to the change in height of the vehicle loadbed with respect to the dock during loading and unloading operations, dock leveler actuating mechanisms are subject to rapid wear and unwanted damage as a result of this type of movement.

In spite of the prior development efforts regarding dock leveler mechanisms, there has been a strong felt need to provide an improved actuating mechanism for the hinged ramp type dock leveler. A need has also persisted for a suitable mechanism to minimize rapid movement of the dock leveler, particularly in a downward direction, if the vehicle being loaded is suddenly pulled away from the loading dock. Still further, there has also been a desire to provide improvements in dock leveler mechanisms which provide for extending the hinged lip at the forward edge of the main ramp to a working position, for latching the lip in a working position and for supporting the ramp in a stored position.

It is to these ends that the present invention has been developed.

SUMMARY OF THE INVENTION

The present invention provides an improved dock leveler apparatus, including an actuator for moving the leveler to a working position.

In accordance with one important aspect of the present invention, a dock leveler apparatus is provided including a ramp which is hinged to a support and is operable to be moved between at rest and working positions by an improved actuator which may be remotely controlled and which is also operable to retract out of forcible engagement with the dock leveler ramp to alleviate damage, or wear and tear on the actuator during movement of the ramp while it is working. In particular, the improved dock leveler utilizes a motor operated linear actuator which is operable to retract an actuator member for raising the ramp out of forcible engagement with the ramp after it has moved the ramp to an inclined position which will allow the ramp to then decline to its working position. The actuator includes a mechanism which effectively prevents transfer of movement of the ramp to the actuator mechanism while the ramp is in its working position.

In accordance with another aspect of the present invention, a dock leveler apparatus is provided which includes an improved ramp actuator and a motion damper mechanism which, in combination, provide for improved movement of the dock leveler between stored and working positions, minimize wear and tear on the actuator mechanism and minimize the chance of rapid movement of the leveler ramp downwardly from a working position in the event of movement of a vehicle out of engagement with the leveler. The leveler apparatus includes a pressure fluid cylinder and piston type damper interconnecting the moveable ramp with the leveler frame and operable to control movement of the ramp in a generally downward direction about its hinge axis as a result of the movement of a vehicle away from the loading dock and to which the leveler is connected or, as a result of action which would result in nonsupport of the ramp.

The present invention also provides a dock leveler and an improved arrangement of a linear actuator with a first counterbalance spring mounted on the actuator mechanism and a second counterbalance spring arrangement connected between the dock leveler ramp and the apparatus frame and wherein at least the second counterbalance spring is adjustable for adjusting the counterbalance force acting on the leveler ramp.

The present invention still further provides a dock leveler apparatus which includes improved mechanisms for extending a lip member hinged to the forward edge of the leveler ramp, latching the lip member in a desired position and providing for movement of ramp support legs to a retracted position in the event that it is desired to move the ramp to a working position below dock level.

Those skilled in the art will further appreciate the above-mentioned features of the invention together with other superior aspects thereof upon reading the detailed description which follows in conjunction with the drawing.

BRIEF DESCRIPTION OF THE DRAWING

FIG. 5 is a section view taken generally along line 5—5 of FIG. 1;

FIG. 8 is a section view taken generally along line 8—8 of FIG. 1;

FIG. 8A is a detail section view of the lip latch member;

FIG. 9 is a detail front elevation of the ramp showing additional features of the lip latch mechanism;

FIG. 12 is a schematic diagram of a control system for the apparatus of the invention;

FIGS. 17 through 20 are partial side elevation views of a dock leveler apparatus in accordance with the invention including a first alternate embodiment of a ramp support leg retraction mechanism;

DESCRIPTION OF THE PREFERRED EMBODIMENTS

Figure 1:
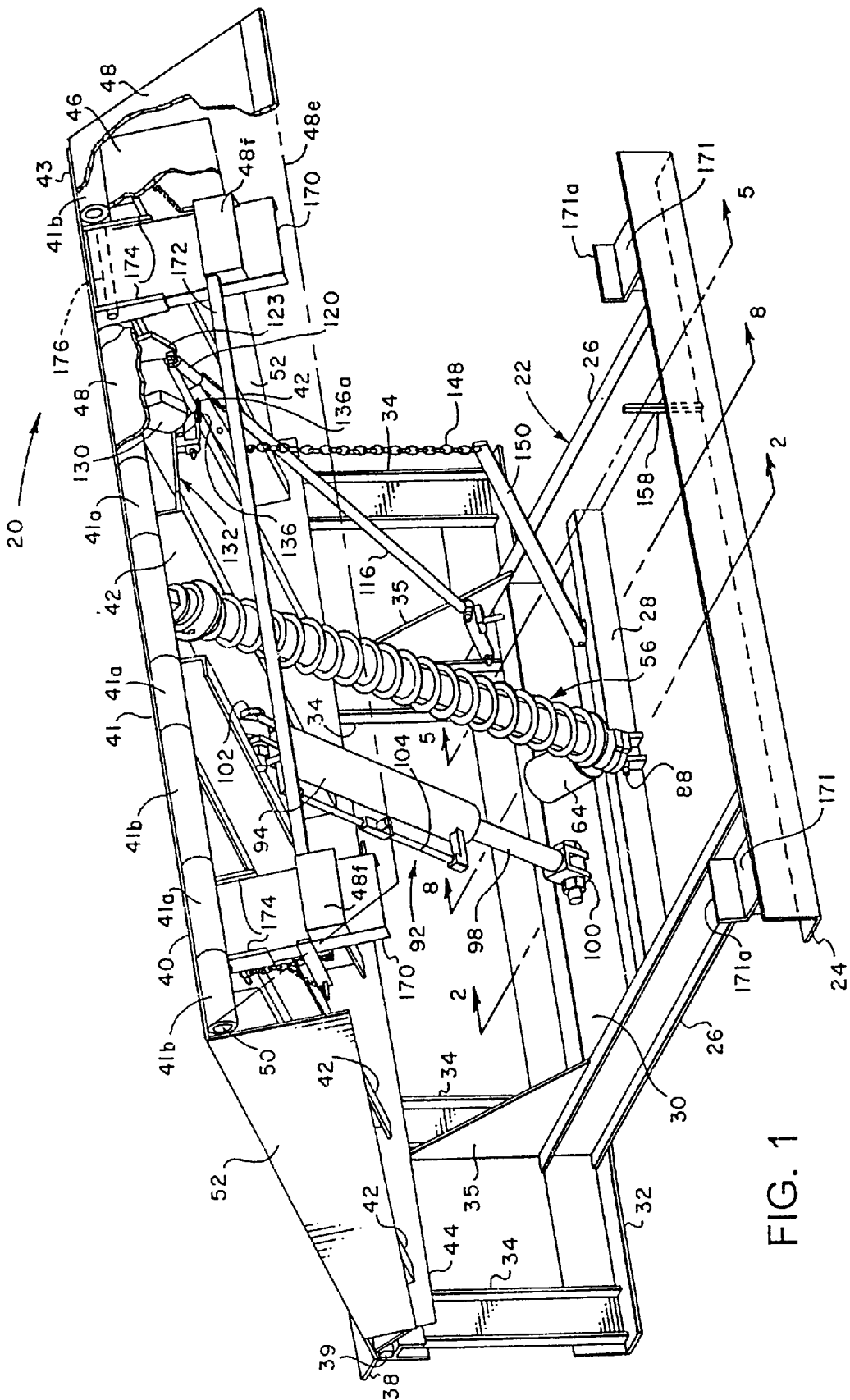
FIG. 1 is a perspective view of a dock leveler apparatus in accordance with the invention.

In the description which follows like parts are marked throughout the specification and drawing with the same reference numerals, respectively. The drawing figures may not necessarily be to scale and certain elements may be shown in somewhat generalized or schematic form or omitted from certain ones of the drawing figures in the interest of clarity and conciseness.

Referring primarily to FIG. 1, a dock leveler apparatus in accordance with the invention is illustrated and generally designated by the numeral 20. The apparatus 20 includes a support frame 22 of generally conventional construction including a transverse, front, angle cross section member 24, two longitudinal channel shaped beams 26 extending transversely to the member 24, intermediate transverse members 28 and 30 and a rear, transverse, angle cross section member 32. Upstanding column members 34 are spaced apart and suitably welded to the transverse member 32. Suitable gussets 35 are also interposed between the inboard column members 34 and the longitudinal beam members 26, as shown, and are preferably suitably welded thereto. The column members 34 also support a ramp hinge plate 38 substantially coextensive with the frame member 32 and supporting suitable hinge means 39 for hingedly connecting a generally planar elongated deck or ramp member 40 to the frame 22. The frame 22 is adapted to be mounted in a suitable generally rectangular pit or recess 33r formed at a loading dock 33, FIG. 2, for example.

Figure 2:
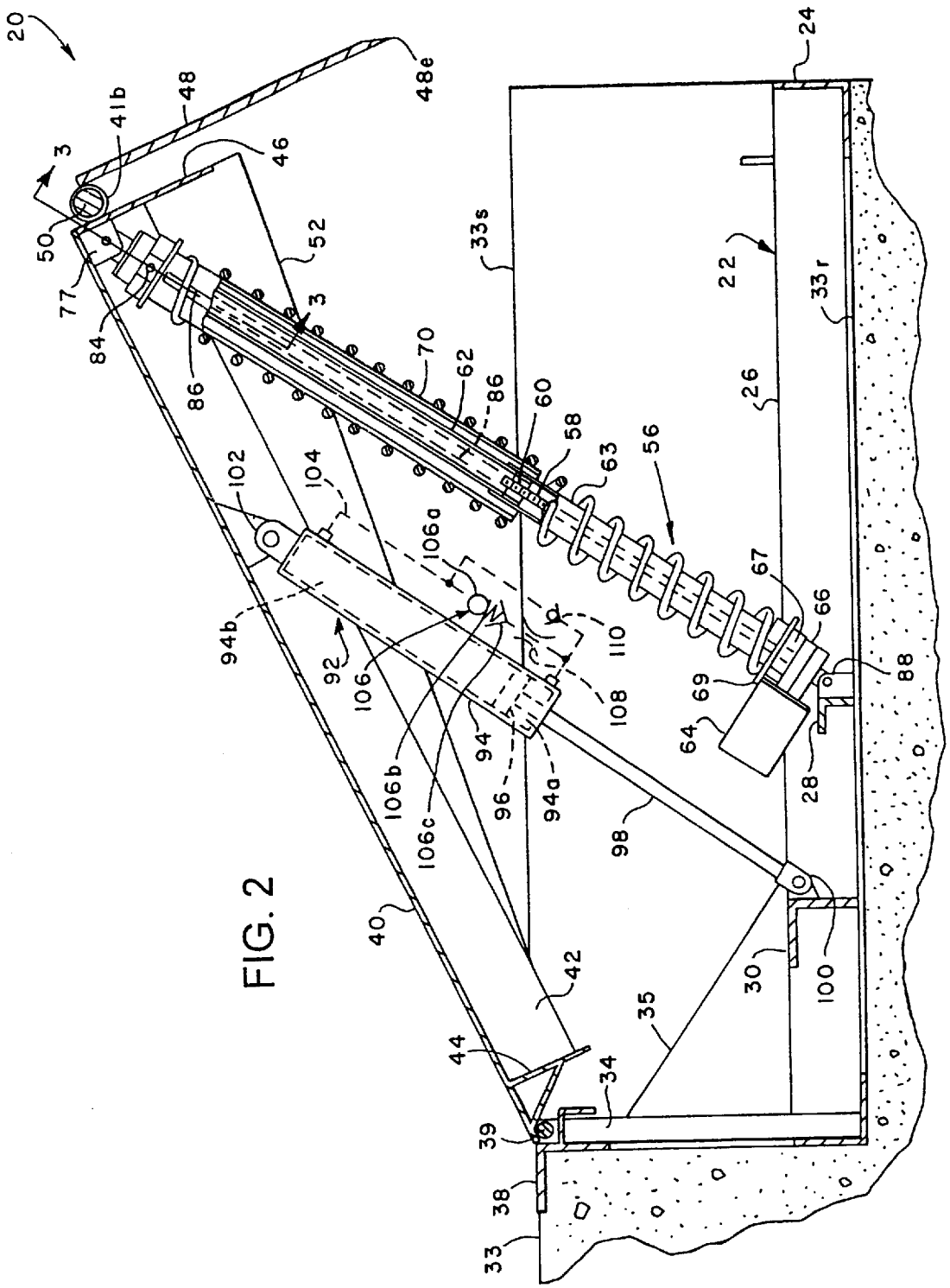
FIG. 2 is a section view taken generally along the line 2—2 of FIG. 1.

The ramp 40 is reinforced by spaced apart, longitudinal beams 42, several shown in FIGS. 1 and 2, extending between a rear face plate 44 and a front face plate 46, only a small portion of which is shown in FIG. 1. The face plate 46 extends across the front or forward edge 41 of the ramp 40 and supports spaced apart tubular hinge members 41a which cooperate with hinge members 41b secured to the rear edge 43 of a generally planar lip member 48 forming an extension of the ramp 40. An elongated hinge pin 50 extends through the tubular hinge members 41a and 41b to form a somewhat conventional hinge connection between the ramp 40 and the lip 48. Other hinge constructions may be utilized in place of that shown in the drawing figures hereof. Elongated side plates or toe guards 52 are secured to the ramp 40 along its respective side edges normal to the forward edge 41, generally as shown in FIG. 1.

Figure 7:
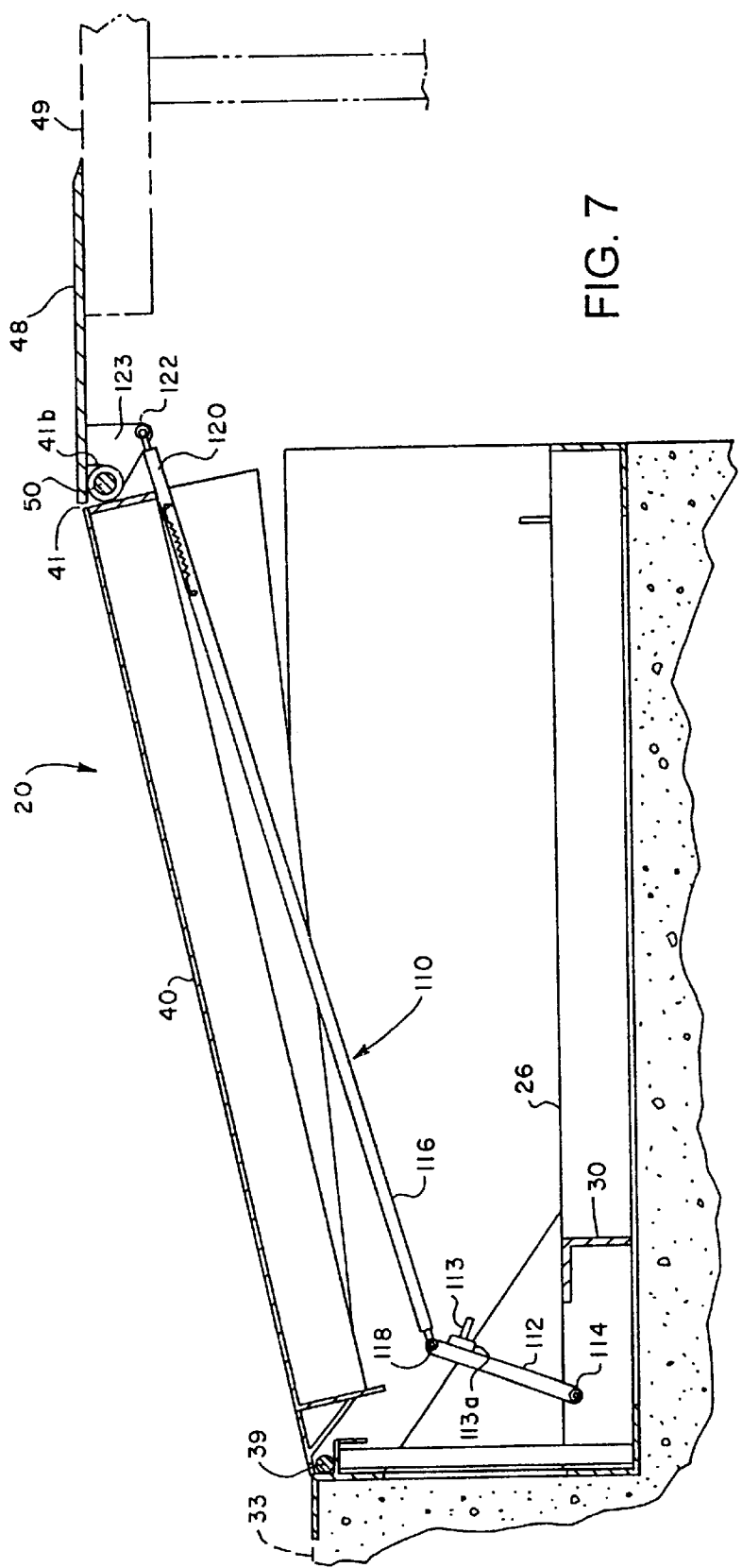
FIG. 7 is a view taken in the same plane as FIG. 5 showing the leveler apparatus in a working position.

Referring further to FIG. 1, and also FIG. 2, the dock leveler apparatus 20 also includes a unique actuator, generally designating by the numeral 56, for moving the ramp 40 between a substantially horizontal, at rest position and a raised position, as shown in FIG. 2, preparatory to moving the ramp to a working position, such as shown in FIG. 7. The actuator 56 is of a generally linear type and is characterized by an elongated rotatable power screw member 58, FIG. 2, which is engageable with a nut 60, secured to one end of an elongated cylindrical linearly extensible tube member 62. The screw 58 is drivenly connected to a suitable electric motor 64 which, through a gear type speed reduction drive mechanism 66, is operable to rotate the screw 58 in opposite directions to cause the actuator member 62 to linearly extend relative to a support tube 63 and to cause the ramp 40 to move about a pivot axis provided by the hinge means 39 to an extended position, generally as shown in FIG. 2. The support tube 63 is suitably connected at its lower distal end to a housing 67 for the gear reduction mechanism 66. A generally circular flange 69 is disposed about the lower end of tube 63. A third outer support tube 70 is disposed in sleeved relationship over the tube 63 and is also operably connected to the actuator extension tube member 62 in a manner to be described herein.

Figure 3:
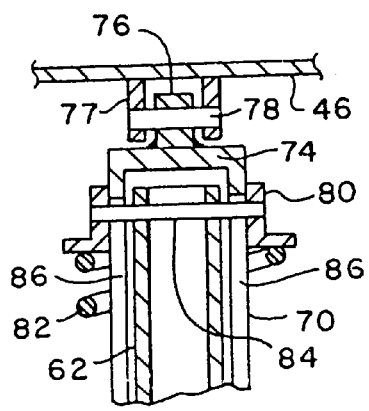
FIG. 3 is a detail section view taken along the line 3—3 of FIG. 2.

Referring further to FIGS. 2 and 3, the actuator support tube 70 includes a transverse head portion 74 having a boss 76 formed thereon and operable to form a pivot connection between the ramp 40 and the actuator 56 at the face plate 46, thanks to the provision of a clevis 77 and clevis pin 78, as shown in FIG. 3. A generally cylindrical flange member 80 is sleeved over the tube 70 in slidable relationship thereto and engages one end of an elongated coil compression spring 82 which is disposed between the flange 80 and the flange 69 and sleeved over the tubes 63 and 70. A transverse pin 84 extends through opposed, elongated, longitudinal slots 86 formed in the tube 70. The pin 84 is also secured to the distal end of the actuator tube member 62 so that, when this member is extended by rotation of the screw 58 in registration with the nut 60, the flange 80 will be extended toward head portion 74 of tube 70 until the pin 84 engages the upper ends of the slots 86 and causes the tube 70 to raise the ramp 40, for example. The screw 58 may be rotated in the opposite direction to retract the extensible tube member 62 in sleeved relationship within the support tube 63, compressing the spring 82 as the flange 80 moves toward the flange 69. This action leaves the tube 70 free to move in a reciprocal telescoping fashion with respect to the tube 63 if, for example, the ramp 40 is caused to move up and down about its hinge means 39. Such action by the ramp 40 may occur frequently in response to movement of a vehicle loadbed relative to dock 33, at which the apparatus 20 is disposed in a conventional manner. Accordingly, in response to rotation of the screw 58 in one direction by the motor 64, the nut 60 and extensible actuator tube member 62 is extended outward from the tube 63 until the pin 84 engages the ends of slots 86 in tube 70 and raises the ramp 40 about its hinge means 39. At any time, the actuator 56 may be reversed to cause the tube member 62 and flange 80 to retract toward the housing 66 thereby allowing the tube 70 to move in telescoping relationship over the support tube 63, at will.

By compressing the spring 82 between the flanges 69 and 80, the ramp extension tube 70 and ramp 40 are free to move downward under the weight of the ramp but controlled by a damper mechanism to be described in further detail herein. The arrangement of the pin 84 connected to the tube member 62 and slidable in the slots 86 also prevents rotation of the extension tube member 62 as it translates linearly in and out of the tube 63 in response to rotation of the screw 58. The actuator 56 is also pivotally connected to the frame 22 at the housing 66 by a suitable clevis type pivot connection 88, FIG. 2.

Figure 4:
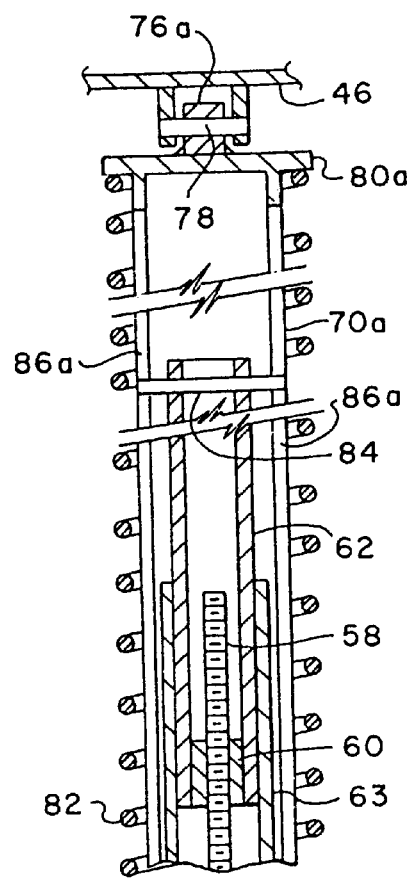
FIG. 4 is a detail section view, similar to FIG. 3, showing an alternate embodiment of the actuator mechanism for the apparatus of the present invention.

Referring briefly to FIG. 4, an alternate embodiment of the actuator 56 and its structure for connection to the ramp 40 is illustrated wherein the tube 70 is replaced by a tube 70a having a transverse flange 80a formed integral with or secured to the tube 70a at one end. Flange 80a includes a boss 76a forming part of a pivot connection using the clevis 77 and the clevis pin 78 in the same manner as the embodiment of FIG. 3. The actuator extension tube 62 is disposed in telescoping relationship within tube 70a and the transverse actuator pin 84 is disposed in opposed elongated slots 86a in the tube 70a. The counterbalance spring 82 is disposed in sleeved relationship around the tube 70a in substantially the same manner as the embodiment of FIG. 3. However, the spring 82 is disposed between the flanges 80a and 69 and exerts a constant upward biasing force on the ramp 40 to counterbalance the weight of the ramp regardless of the position of the extensible tube member 62.

Accordingly, in the embodiment of FIG. 4, when the actuator motor 64 is operated to rotate screw 58 and cause extension of the tube 62 the ramp 40 will be raised when the pin 84 engages the tube 70a at the outer distal ends of the slots 86a with the assistance of the force exerted by the counterbalance spring 82. When the actuator tube 62 is retracted, in response to rotating the screw 58 in the opposite direction, the tube 70a is free to telescope over the tube 63 to allow movement of the ramp 40 without imposing any damaging forces on the actuator tube member 62, the nut 60 or the screw 58. However, the biasing effort of the counterbalance spring 82 is constantly urging the ramp 40 to pivot in a counterclockwise direction, viewing FIG. 2. Moreover, as with the embodiment of FIGS. 2 and 3, the actuator arrangement of FIG. 4 allows the ramp 40 to undergo oscillatory movement during loading and unloading operations without imposing damaging forces on the linear actuator 56. Another advantage of the actuator 56 resides in mechanism provided by the screw 58 and nut 60 wherein, as the nut 60 is advanced to the distal end of the screw 58, a free wheeling effect is provided which prevents damage to the actuator once it has extended the ramp as far as it is capable of doing. A preferred type of actuator which includes this feature is available from Motion Systems Corporation, Eatontown, N.J., as one of their 85199/85200 series ball drive actuators.

Referring again to FIGS. 1 and 2, the dock leveler 20 also includes a unique arrangement of a hydraulic motion damper 92 for damping the movement of the ramp 40 about the hinge 39 in a clockwise direction, viewing FIG. 2. The damper 92 comprises a hydraulic piston and cylinder actuator mechanism including a conventional cylinder member 94 in which is slidably disposed a piston 96 dividing the cylinder into opposed chambers 94a and 94b, FIG. 2, in a conventional manner. The piston 96 is connected to an elongated extensible piston rod 98 which is connected at its distal end to the frame member 30 at a clevis type pivot connection 100. The opposite end of the actuator 92 is pivotally connected to the ramp 40 at a suitable pivot connection 102. A quantity of hydraulic fluid is charged to the cylinder 94 for transfer between the opposed chambers 94a and 94b. The damper 92 is preferably aligned with actuator 56 midway between opposite sides of the ramp 40, as shown, and disposed between actuator 56 and hinge means 39.

Fluid is transferred between chambers 94a and 94b by way of conduit means 104, FIG. 2, through a circuit including a so called velocity fuse 106 shown schematically in FIG. 2, a flow restricter 108 and a bypass check valve 110 also interposed in the circuit. The circuit is somewhat exemplary but provides means for damping the motion of the ramp 40 in a downward direction about the pivot axis formed by the hinge 39. For example, when the ramp 40 is raised by the actuator 56 fluid is transferred from chamber 94a at the piston rod end of cylinder 94 to chamber 94b at the end at which the clevis 102 is disposed, by way of the circuit just described, including the check valve 110, which is operable to open to minimize any resistance to fluid flow.

However, when fluid is urged to flow out of chamber 94b toward chamber 94a it must pass through the velocity fuse 106 and the flow restricter 108. The flow restricter 108 is normally sufficient to throttle flow of fluid out of chamber 94b to retard the motion of the damper 92 as the piston 96 telescopes into the cylinder so that the ramp 40 moves downwardly relatively slowly such as under a condition wherein the loadbed of the vehicle being loaded or unloaded moves up and down in response to changing load conditions. However, in a situation where, for example, the vehicle in engagement with the leveler 20 should suddenly move away from the loading dock 33, the weight of the ramp 40 may be such as to cause relatively rapid downward movement, even with the flow restricter 108 in the circuit provided by the conduit 104 and even though all flow is forced through the restricter 108 by closure of the check valve 110.

In such circumstance just described the velocity fuse 106 will, at a certain fluid flow rate, close to arrest movement of the ramp 40 downwardly, thus minimizing the risk of a person, persons or a vehicle on the ramp 40 from being pitched off of the ramp due to any violent or rapid downward movement. The velocity fuse 106 may, for example, comprise a closure member 106a having a biasing spring 106 b which normally holds the closure member at least slightly open to allow fluid flow from chamber 94b toward chamber 94a. However, at a certain rate of fluid flow through conduit 104 fluid pressure forces acting on the closure member 106 a will overcome the urging of the biasing spring 106 b and cause the closure member to engage a seat 106c to totally shut off flow between the chambers 94b and 94a, as long as a sufficient pressure differential exists across the closure member. The particular configuration of the motion damper 92 is advantageous. However, a conventional automotive type suspension shock absorber may also be used as a motion damper for the ramp 40. Moreover, damper 92 may be controlled by a suitable hydraulic circuit to lock ramp 40 in a selected position.

Referring now to FIGS. 1, 5, 6 and 7, the dock leveler 20 includes a mechanism for extending the lip 48 from a depending position, as shown in FIGS. 1 and 5, to an extended position as shown in FIG. 7 whereby the lip may be utilized to engage a loadbed 49, FIG. 7, comprising, for example, the loadbed of a trailer of a motor truck disposed at the dock 33. Accordingly, the ramp 40 and lip 48 form a pathway for transferring cargo between the dock 33 and the loadbed 49. The extension mechanism is generally designated by the numeral 110 and includes a toggle linkage including a first link 112 pivotally connected to one of the frame members 26 at a pivot connection 114. A second link 116 is pivotally connected to link 112 at a pivot connection 118 and link 116 is connected to a third link 120 which is pivotally connected to the lip 48 at a pivot connection 122 secured to a gusset 123 suitably welded to the lip 48 at one of the hinge tubes 41b, for example, as shown.

Figure 6:
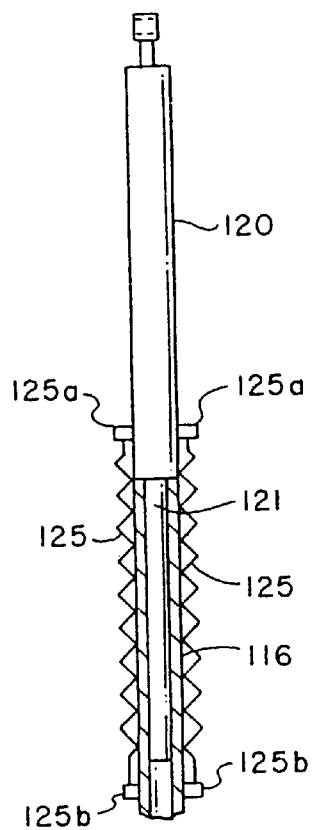
FIG. 6 is a detail view showing certain features of the lip extension linkage shown in FIG. 5.

The relationship between links 116 and 120 is further illustrated in FIG. 6. The link 120 includes an elongated, generally cylindrical rod portion 121 which is adapted to be telescopically slidably disposed in the tubular link 116 and held in engagement therewith by opposed tension coil springs 125 connected to the link 120 and to the link 116 at their opposite ends, as indicated at 125a and 125b, respectively. Moreover, as shown in FIG. 5, the link 112 includes a position adjustment pin 113 mounted thereon and engageable with the frame member 30 to limit the movement of the link 112 in a clockwise direction about its pivot connection 114, viewing FIG. 5. The pin 113 may comprise a threaded member such as a lockable bolt supported on a boss 113a secured to link 112 and operable to be rotated to adjust the effective length of the pin 113 and thus the pivotal position of link 112 about the pivot axis formed by the pivot connection 114.

In the position of the ramp 40 shown in FIGS. 1 and 5, the ramp has been raised from a generally horizontal stored position to a position from which the ramp may be lowered into engagement with loadbed 49, for example. As the ramp 40 is raised by the actuator 56, not shown in FIGS. 5 or 7, the lip 48 will be in a generally depending position, as shown in FIG. 5, and the extension linkage 110 will move to the position shown in FIG. 5 with the pivot connection 118 being slightly downwardly over center with respect to a straight line between pivot connections 114 and 122. If the ramp 40 is raised to a point exceeding the depending limit position of the lip 48 which the maximum length of the mechanism 110 is capable of achieving, the link 120 may telescope or extend partially out of the link 116 until the ramp is brought back to the position shown in FIG. 5. The link 120 will remain engaged with the link 116, however.

As the ramp 40 is lowered by movement in a clockwise position about the hinge 39, viewing FIG. 5, the lip extension mechanism 110 will urge the lip 48 to pivot in a counterclockwise direction about hinge 50 to move to the position shown in FIG. 7 with respect to the plane of the ramp 40. As the ramp 40 moves downwardly toward the working position shown in FIG. 7 the mechanism 110 will undergo a toggle type actuation and the pivot connection 118 will go overcenter in the opposite direction or upwardly until the links 112 and 116 assume the general position shown in FIG. 7.

Once the links 112 and 116 go over center the lip 48 may move to a depending position rather rapidly except for the provision of a latch mechanism to be described hereinbelow. However, if loadbed 49 or other structure is disposed below the distal edge 48e of the lip 48, the lip will engage such structure and assume a working position. Moreover, once a structure, such as the loadbed 49 is removed from engagement with the lip 48 it will pivot downwardly to its depending position since the mechanism 110 is not in a position to urge the lip to extend outward from the ramp 40. Bumpers 48f, FIG. 1, are operable to engage lip 48 when it swings downward as just described.

As shown in FIG. 7, for example, if loadbed 49 moves away from the lip 48 it will pivot in a clockwise direction, viewing FIG. 7, to its depending position as the link 112 moves counterclockwise to allow link 116 to move with the movement of the lip. When the ramp 40 is subsequently raised by the actuator 56 during a new operating cycle, the linkage 112, 116 will initially move back to the position shown in FIG. 5 so that, as the ramp 40 is again lowered from the position shown in FIG. 5 toward the position shown in FIG. 7, the mechanism 110 will be effective to initially raise the lip 48 until the pivot connection goes "over center" and then allow the lip 48 to move into engagement with the loadbed 49.

In the view of FIG. 7, only the lip extension linkage 110 is shown connected to the ramp 40 and other mechanism described hereinabove and hereinbelow has been omitted in the interest of clarity. Moreover, the position of the ramp 40 and the lip 48 shown in FIG. 7 is somewhat exemplary of one of several working positions which the ramp and lip may assume when forming a path for traffic between the dock 33 and the loadbed 49.

Referring now to FIGS. 1, 8, 8A and 9, the lip 48 is operable to be latched in a position, as indicated in FIG. 8, to facilitate operation of the leveler 20 when moving to a working position. A latch mechanism including a latch member 130 is suitably secured to the lip 48 including one of its hinge members 41b, for example. The latch mechanism also includes an elongated latch bar assembly 132 which includes an elastically bendable latch bar 134 secured to the underside 40a of ramp 40 by a suitable bracket 135 and a pivot pin connection 137. The opposite end of the latch bar 134 is connected to a latch member comprising a resiliently deflectable bar 136 having a distal end 136a which is operable to be engaged with a notch 138 formed in the latch member 130. Latch member 136 is suitably secured to the latch bar 134 by a bracket 139 allowing the latch member 136 to be supported in cantilever fashion projecting through a suitable slot 46b formed in the ramp face plate 46.

As shown in FIG. 9, the latch member 136 is biased into a position to engage the latch member 130 by a lever 142 which is mounted on a pivot pin 144 secured to the face plate 46. The opposite end of the lever 142 includes a boss 146 secured to one end of flexible means, such as a chain 148, the opposite end of which is connected to a counterweight bar 150, see FIG. 8. The bar 150 is pivotally connected to the frame member 28 at a pivot connection 152 and is free to move about the pivot connection to exert the influence of its weight on the lever 142 to bias the latch bar assembly 132 in a generally upward or counterclockwise direction, viewing FIG. 8, about the pivot connection 137 formed between the bar 132 and the bracket 135. Upward biasing movement of lever 142 may be limited by a stop 46c, FIG. 9, on face plate 46.

Referring to FIG. 8A, the latch member 136 is mounted on the bracket 139 for pivotal movement about a pivot pin 139a and is normally biased from movement in a clockwise direction by the lever 142. Moreover, the latch member 136 is limited in its movement in a counterclockwise direction with respect to bracket 139, viewing FIG. 8A, by an adjustable stop member 136b comprising a threaded fastener which is engageable with a stop boss 139b formed on bracket 139. The pivot stop formed by the members 136b and 139b allow for adjustment of the position of the latch member 136 which will provide for engagement with the latch member 130 at the notch 138. This adjustment feature is also operable to control the amount of deflection of the latch bar 134 which will result in pivotal movement of the latch member 136 to cause disengagement from the latch member 130.

When the ramp 40 and lip 48 are moved to the position shown in FIG. 8 by the actuator 56 and the lip extension mechanism 110 the counterweight 150 and chain 148 pivot the lever 142 to a position to bias the latch bar assembly 132 into a position such that any movement of the lip 48 in a clockwise direction, viewing FIG. 8, about its hinge pin 50 will cause the latch member 130 to engage the latch member 136 to hold the lip 48 in a substantially extended position, as shown in FIG. 8. This position will be maintained until one of three conditions is encountered.

For example, when a force of approximately one hundred pounds is applied to the distal edge 48e of the lip 48, resilient latch bar 134 is caused to deflect or bow upwardly, viewing FIG. 8, to cause the latch member 136 to move out of the notch 138 in latch member 130 allowing the latch member 130 to pivot over the latch member 136 and allowing the lip 48 to pivot about its hinge to a depending position.

A second condition which will cause disengagement of the latch members 130 and 136 arises when the lip 48 engages a loadbed such as the loadbed 49 in a normal working position of the lip. In this position the counterweight 150 has rotated to an at rest position on the frame 22 thereby substantially reducing any effort by the lever 142 to bias the latch bar assembly 132 in a counterclockwise direction, viewing FIG. 8. In fact, the weight of the latch bar assembly 132 under such condition is enough to allow the latch bar to pivot downwardly out of a position which could cause member 136 to engage latch member 130. Accordingly, once a loadbed such as the loadbed 49 moves away from the lip 48 when it is in a working position, such as shown in FIG. 7, for example, the lip is free to rotate to a depending position similar to that shown in FIG. 1.

A third condition under which the latch members 130 and 136 will disengage is when the dock leveler ramp 40 pivots clockwise below the level or plane of dock 33, as indicated by the surface 33s in FIG. 1, under which circumstance the latch member 136 will engage an upstanding latch release member 158, see. FIG. 1, causing deflection of the latch member 136 sufficient to disengage it from the latch member 130 in a manner similar to that described above, that is, causing the latch bar 134 to bow or deflect sufficiently to move the latch member 136 out of engagement with the latch member 130 and allowing the lip 48 to pivot to a depending position. Again, once the ramp 40 is raised by the actuator 56 and the extension mechanism 110 moves the lip 48 to an extended position the latch 136 is returned to a position such that it will engage the latch member 130 upon movement of the lip 48 in a clockwise direction, viewing FIG. 8.

Figure 10:
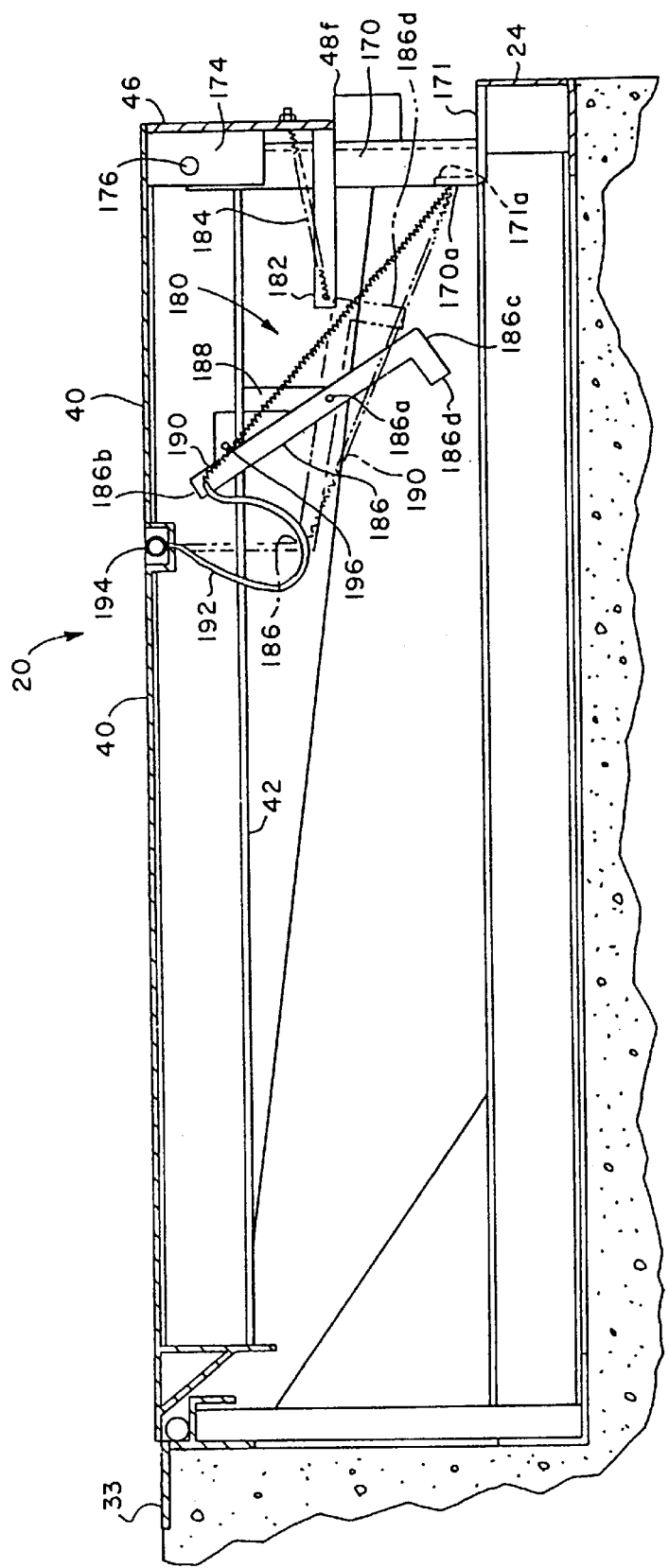
FIG. 10 is a side elevation of the apparatus of FIG. 1 showing certain features of a ramp support leg retraction mechanism.

Referring again to FIG. 1, the dock leveler 20 also includes two depending support legs 170 which are spaced apart from each other and pivotally supported on the ramp 40 adjacent to the legs forward edge 41. The legs 170 support the bumpers 48f, respectively, and the legs are interconnected by an elongated member 172. The legs 170 are preferably formed of channel shaped cross section members and are each supported between spaced apart depending support brackets 174 having pivot pins 176 extending therebetween and engaged with the legs 170, see FIG. 10 also. The legs 170 are engageable with respective L-shaped brackets 171, FIG. 1, suitably secured to the forward frame member 24 as shown in FIGS. 1 and 10. The brackets 171 have upstanding lip portions 171a which are operable to be disposed between the flanges of the channel shaped legs 170 and the brackets also engage leg distal ends 170a to support the ramp 40 in a position substantially coplanar with the surface 33s of the dock 33.

Figure 11:
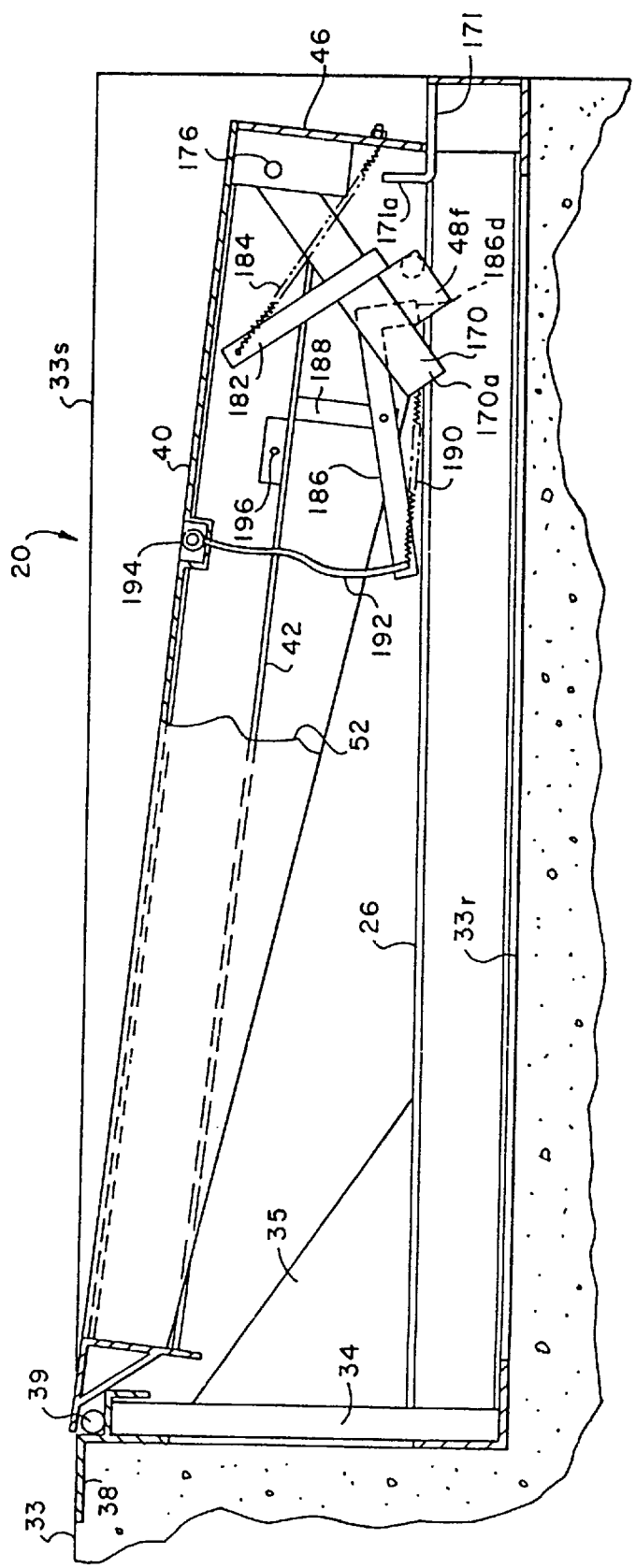
FIG. 11 is a view similar to FIG. 10 showing the ramp support legs retracted.

Referring now to FIGS. 10 and 11, the dock leveler lip 48 is shown removed from the ramp 40 in the interest of clarity and a support leg retraction mechanism is illustrated and generally designated by the numeral 180. The mechanism 180 is operable to retract the legs 170 into the position shown in FIG. 11 so that the ramp 40 may be dropped to a declined, below dock position, as shown, for operation to connect the dock leveler with a vehicle, not shown, having a low loadbed height, for example.

Referring further to FIGS. 10 and 11, each of the legs 170 includes a transverse rearwardly extending arm 182 disposed between the lower distal end 170a of the leg and pivot pin 176. A coil tension spring 184 is interconnected between distal end of arm 182 and face plate 46, as shown. An actuating link 186 is supported on the ramp 40 by a depending support member 188 secured to one of the longitudinal beams 42, as shown in FIG. 10, and supporting the link 186 for pivotal movement about a pivot axis formed by suitable pivot pin means 186a. The link 186 includes a first arm portion 186b extending on one side of the pivot pin 186a and a second arm 186c extends in the opposite direction from pivot pin 186a. A transverse depending arm portion 186d is formed at the distal end of arm 186c. A coiled tension spring 190 is secured at its opposite ends to the distal end of arm 186b and at a point adjacent distal end 170a of one of the legs 170, as shown. The link 186 is normally in the position indicated by alternate position lines in FIG. 10 whereby the spring 190 exerts insufficient force to overcome the force of springs 184 which tend to hold the legs 170 in a position which will support the ramp 40 as shown in FIG. 10.

However, the distal end of arm 186b is connected to a flexible lanyard 192 which may extend through an opening in ramp 40 and connected to a suitable member 194 disposed above the ramp and which may be grasped to pull on the link 186 to move it in a clockwise direction, viewing FIG. 10. The spring 190 is stretched as the link 186 is moved to the position shown by the solid lines in FIG. 10 and engages a stop pin 196 supported on the beam 42. In the above-described position of link 186, the spring 190 has been stretched to increase its tension sufficiently to overcome the bias of the springs 184. Under these conditions, once the ramp 40 is elevated sufficiently above the brackets 171, 171a to provide clearance for the distal end 170a of legs 170 the legs are moved to the position shown in FIG. 11 whereby the ramp 40 may be declined to the position shown in FIG. 11 to provide a path between the dock 33 and a loadbed, not shown.

When the legs 170 move to the position shown in FIG. 11, the tension in spring 190 is relaxed sufficiently to allow link 186 to move to the position shown. Also, when the ramp 40 declines to the position shown in FIG. 11 the link 186 may be rotated by engagement of distal end of arm portion 186d with a frame member 26 back to the position shown. In this position of link 186 the spring 190 exerts a reduced force acting on the legs 170. Thus, when the ramp 40 is moved upwardly, in a counterclockwise direction about hinge 39, viewing FIG. 11, the springs 184 will move the legs 170 back to the position shown in FIG. 10 with respect to the ramp 40 so that the legs may be operable to support the ramp in the position shown in FIG. 10.

Referring now to FIG. 12, there is illustrated an a.c. electrical control circuit for operating the actuator 56, including the motor 64 indicated in FIG. 12. The reversible a.c. motor 64 is in circuit with a switch 200 and a relay 202 which is controllable by a timer 204. An emergency stop switch 206 is also interposed in the circuit, as illustrated. On movement of the switch 200 to the alternate position from that shown in FIG. 12, the motor 64 is operated in the forward or raise direction of the ramp 40. When the ramp 40 is raised to a desired position, such as illustrated in FIGS. 1 and 2, preparatory to being lowered into a position to engage a loadbed, switch 200 is moved to the position shown and the timer circuit 204 is activated. The switch 200 is normally biased in the position shown in FIG. 12 to open the circuit which drives the motor 64 in the direction to raise the ramp 40. When the actuator 201 for the switch 200 is released, the switch moves to the position shown in FIG. 12 to cause the motor 64 to be energized in the reverse direction to retract the actuator extension tube 62, FIG. 2. The switch contacts 203 are also opened which starts operation of the timer circuit 204 and after a predetermined time, say about thirty seconds, the timer circuit causes relay 202 to open to deenergize motor 64. The timer circuit 204 may be adjustable so that the time during which the relay contacts 202 are closed and the motor 64 is operated in the direction which lowers the extension tube 62 may be adjusted to assure that the actuator is sufficiently retracted to not interfere with or be damaged by movement of the ramp 40 in an oscillatory manner, for example, as previously described.

During raising of the ramp 40 to the position shown in FIG. 2 from a position such as that shown in FIG. 10, for example, the legs 170 will remain in the position of FIG. 10 unless the actuator member 186 is moved to the position shown in FIG. 10 from its alternate position shown by the alternate position lines in FIG. 10. Moreover, as the ramp 40 is raised to the position shown in FIG. 2 the lip extension linkage 110 will typically move from the position shown in FIG. 7 to the position shown in FIG. 5 so that, upon commencing to lower the ramp 40, the lip 48 will be moved in a counterclockwise direction, viewing FIG. 5, about the hinge pin 50 so that the lip may engage the loadbed 49 when the ramp 40 has been moved to the position of FIG. 7. Thanks to the toggle links 112 and 116 and the above-described latch mechanism, lip 48 will remain extended until the ramp 40 is lowered to a predetermined position and the pivot 118 moved over center from the position shown in FIG. 5 to a position similar to that shown in FIG. 7. The lip 48 will also be maintained in its extended position by the latch mechanism described above and shown in FIGS. 8 and 9 until the lip 48 engages the loadbed 49 and the counterweight 150 has come to rest to reduce tension on the chain 148.

If it is desired to retract the legs 170 prior to lowering the ramp 40 to a position such as shown in FIG. 11, the lanyard 192 is pulled to move the link 186 to the position shown in FIG. 10 so that, upon movement of the ramp 40 to a position such that the legs may clear the upstanding lips or projections 171a, the legs will then move to the position shown in FIG. 11 with respect to the ramp 40. The ramp 40 may then be lowered to a position such as that shown in FIG. 11, or any intermediate position which would otherwise be prevented by the normal working position of the legs 170 with respect to the ramp 40, as shown in FIG. 10.

Figure 13:
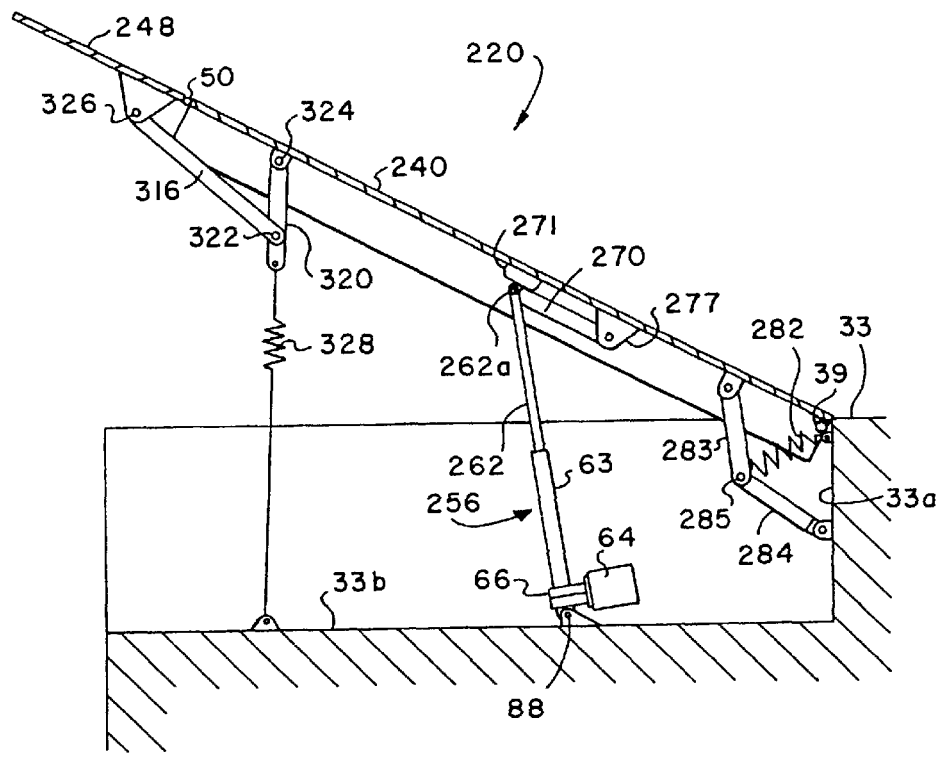
FIGS. 13 and 14 are side elevations of a first alternate embodiment of the dock leveler apparatus of the invention in two operating positions, respectively.
Figure 14:
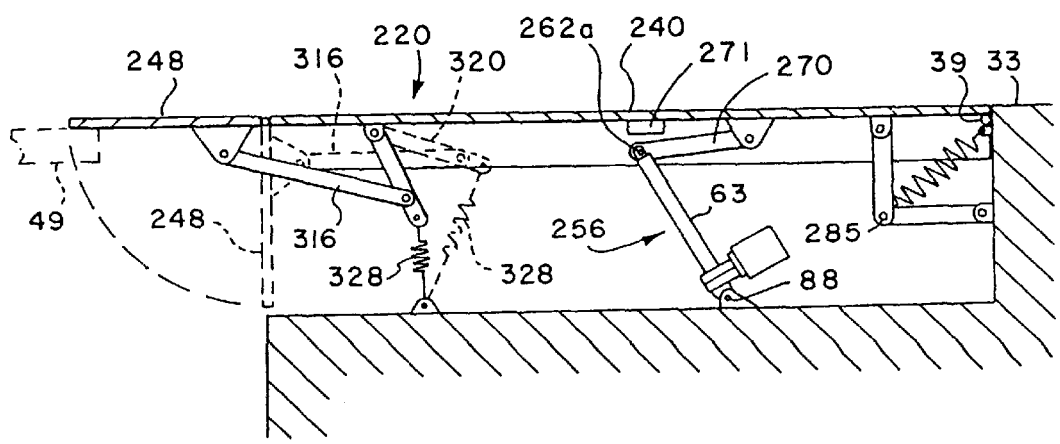

Referring now to FIGS. 13 and 14, a first alternate embodiment of a dock leveler in accordance with the invention is illustrated and generally designated by the numeral 220. The dock leveler 220 includes a ramp 240 which is hinged to dock 33 at hinge means 39 for pivotal movement between working and stored positions. A lip 248 is hinged to the forward edge of the ramp 240 at hinge means including a hinge pin 50, such hinge means being substantially the same as the hinge between the lip 48 and the ramp 40 of the dock leveler 20. The dock leveler 220 is operable to be moved from a stored position to an elevated position, as shown in FIG. 13, preparatory to movement downward into a position in engagement with a load deck of a vehicle, not shown.

The ramp 240 is moved from a stored position to an elevated position shown in FIG. 13 by an actuator 256 similar to the actuator 56 and including a drive motor 64, a gear reduction drive 66 and a support tube 63 for the power screw, not shown in FIG. 13. An extensible tube member 262 is shown for the actuator 256 which is similar to the tube member 62 and is operable to be telescoped in and out of the tube 63 in response to rotation of the aforementioned screw. The distal end 262a of tube member 262 is pivotally connected to a pivot link 270 which, in turn, is pivotally connected to the deck 240 at a clevis type pivot connection 277.

When the actuator 256 is operated to extend the tube member 262 the link 270 pivots to the position shown wherein it engages an abutment 271 on the underside of deck 240. Further extension of the tube member 262 from the tube 63 will elevate the ramp 240 upwardly about the hinge means 39. Movement of the ramp 240 upwardly may be assisted by a counterbalance spring 282 secured to a wall 33a of dock 33 at one end of the spring and to a connection between two pivot links 283 and 284 which are, respectively, pivotally connected to the ramp 240 and to the dock wall 33a, as shown. The links 283 and 284 are also pivotally connected to each other at pivot means 285, as shown.

Referring to FIG. 14 the leveler 220 is shown in a working position with the lip 248 engaged with a loadbed 49. The position of the ramp 240 shown in FIG. 14 also coincides with a typical storage position for the leveler 220. In the working position shown in FIG. 14 the actuator extension tube member 262 has been retracted substantially within the tube 263 and the link 270 has moved away from the abutment 271 so that, in the event that the ramp 240, moves about its hinge 39 in response to changes in the elevation of the loadbed 49, the ramp may move without imposing undue forces on the actuator 256. Thanks to the configuration of the actuator 256 and its mounting on the pivot 88 the ramp 240 may move up and down while the link 270 and the actuator 256 merely move with respect to each other in scissors-like fashion about the pivot at distal end 262a without any undue force being imposed on the actuator mechanism 262. Accordingly, a so called lost motion coupling is provided between the actuator 256 and the ramp 240 which allows the ramp to move with respect to the actuator without imposing any damaging forces on the actuator or causing the mechanism of the actuator itself to be driven by the forces imposed thereon.

The lip 248 is provided with suitable extension linkage, such as the links 316 and 320, FIG. 13, which are pivotally connected to each other at 322. The link 320 is pivotally connected to the ramp 240 at 324 and the link 316 is pivotally connected to the lip 248 at pivot means 326. A tension coil spring 328 is connected to the link 320 and to the dock bottom wall 33b for the dock pit in which the leveler 220 is disposed. Accordingly, the dock leveler 220 also enjoys the benefits of the actuator 256 which, upon positioning the ramp 240 and the lip 248 for transporting loads across the dock leveler between the dock 33 and a loadbed 49, allows movement of the ramp 240 without imposing damaging forces on the actuator.

Figure 15:
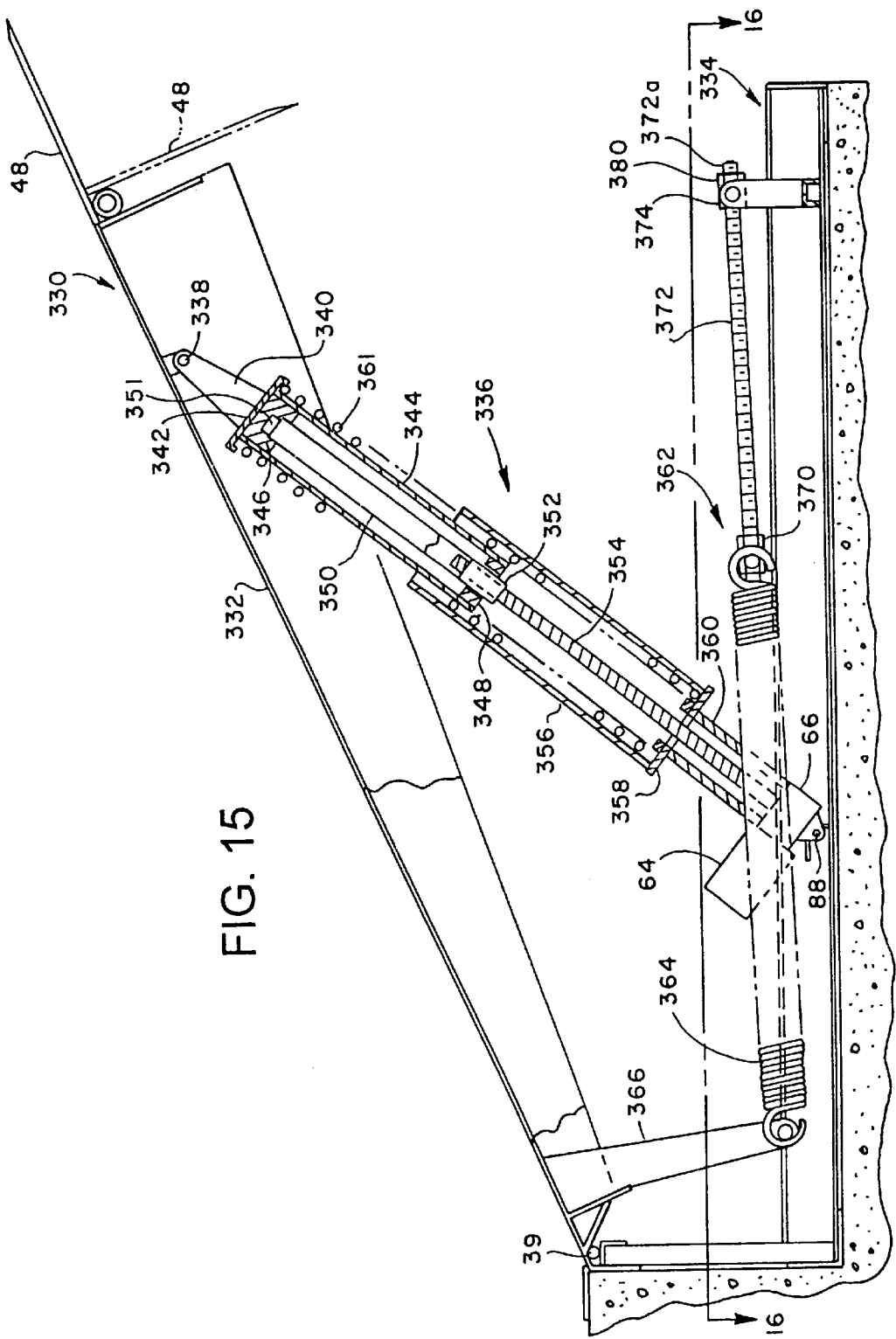
FIG. 15 is a side elevation, partially sectioned, of a second alternate embodiment of a dock leveler apparatus in accordance with the invention.

Referring now to FIG. 15, a second alternate embodiment of a dock leveler apparatus in accordance with the invention is illustrated and generally designated by the numeral 330.

The dock leveler apparatus 330 includes a ramp 332 similar in most respects to the ramp 40 and supported on a frame 334, similar in many respects to the ramp 22, for pivotal movement about a hinge 39. The ramp 332 is connected to one end of a linear actuator 336 at a pivot connection 338. Actuator 336 includes a suitable clevis member 340 having a generally cylindrical transverse flange 342 supporting an elongated guide tube 344. An actuator abutment member 346 is disposed within the tube 344 and is contiguous with the flange 342, as illustrated. Guide tube 344 includes a transverse guide flange 348 formed at its end opposite the abutment member 346 and operable to journal an elongated actuator extension tube 350. Extension tube 350 is operably connected to a recirculating ball nut 352 which is threadedly engaged with an elongated actuator screw 354. Actuator screw 354 is adapted to be rotatably driven by a reversible electric motor 64 through a suitable right angle gear drive mechanism 66.

Actuator 336 also includes an outer guide tube 356 having a transverse bottom flange 358 and a cylindrical support member 360 extending from a housing 67 for the gear reduction drive mechanism 66 and supported thereby. An elongated coil compression counterbalance spring 361 is sleeved over guide tube 344 and extends between flanges 358 and 342 and within guide tube 356. The lower end of the actuator 336 is supported on the frame 334 at a pivot connection 88 in a manner similar to which the actuator 56 is supported on frame 22. The portion of the actuator 336 including the motor 64, the gear drive mechanism 66, the screw 354, the ball nut 352 and the extension tube 350 may also comprise a linear ball drive actuator of the 85199 series available from Motion Systems Corporation.

The actuator 336 is advantageously arranged in that the counterbalance spring 361 is journaled within the guide tube 356 and the extension tube 350 is provided with a suitable tang 351 at its distal end which fits in a cooperating slot in the abutment member 346 to prevent rotation of the extension tube 350 as the screw 354 is rotated.

Figure 15A:
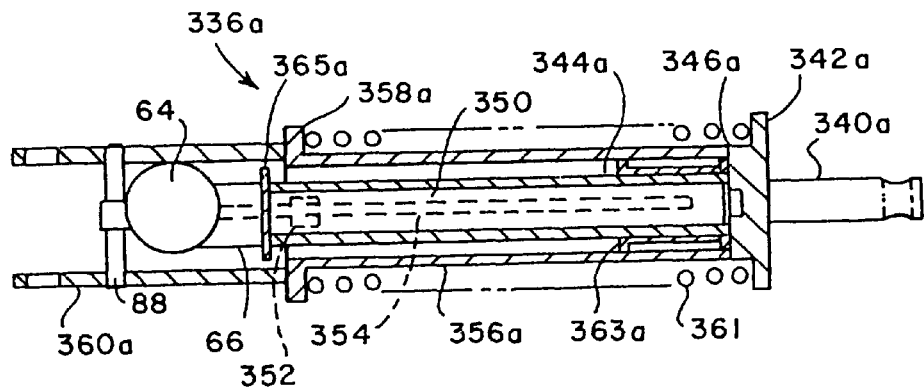
FIG. 15A is a longitudinal central section view of another embodiment of a linear actuator.

Referring now to FIG. 15A, another embodiment of an actuator for the dock leveler of the present invention is illustrated and generally designated by the numeral 336a. The actuator 336a includes the reversible electric motor 64, right angle gear drive mechanism 66 and actuator extension tube 350, also operably connected to a recirculating ball nut 352 which is operably connected to an actuator screw 354, both shown disposed within extension tube 350 in FIG. 15A. Extension tube 350 is disposed within a guide tube 344a which is engaged with an abutment member 346a having a generally circular flange 342a formed thereon. A shaft member 340a is suitably connected to the flange 342a and is operable to be connected to the ramp 332 at pivot connection 338, in place of the actuator 336.

The actuator 336a also includes an outer guide tube 356a having a transverse flange 358a formed thereon and operable to retain one end of coil compression spring 361, the opposite end of the spring being engaged with flange 342a. A flanged spool member 363a is disposed within guide tube 356a at the end of the tube which is adjacent the abutment member 346a in the retracted or collapsed position of actuator 336a, shown in FIG. 15A. The spool member 363a is suitably permanently connected to the guide tube 356a, such as by welding. The end of tube 344a opposite the abutment 346a is also provided with a flange 365a, the diameter of which allows the flange to slide within the tube 356a until it engages the spool 363a. The spool 363a suitably journals the tube 344a with respect to the tube 356a and delimits axial extension of the guide tube 344a with respect to the tube 356a when the flange 365a engages the spool. In this way, if the aforementioned nut becomes disengaged from the screw on assembly or disassembly of the actuator 336a, the abutment 346a and guide tube 344a will not become disengaged from the actuator. A suitable yoke-type mounting bracket 360a is connected to the flange 358a and supports the motor 64 by a pin 88. The end of the yoke member 360a opposite the end which is attached to the flange 358a is adapted to be suitably supported on the dock leveler frame by a pivot pin, not shown in FIG. 15A. Upon assembly of the actuator 336a, the flange 365a may be suitably welded to the tube 344a and the spool 363a may be suitably welded to the tube 356a to prevent the aforementioned unintended disassembly of the actuator. In the embodiment of the actuator shown in FIG. 15A, the tubes 344a, 356a, the spool 363a and the flange 365a are preferably formed of a suitable metal which is easily weldable upon assembly of the actuator as described above.

Figure 16:
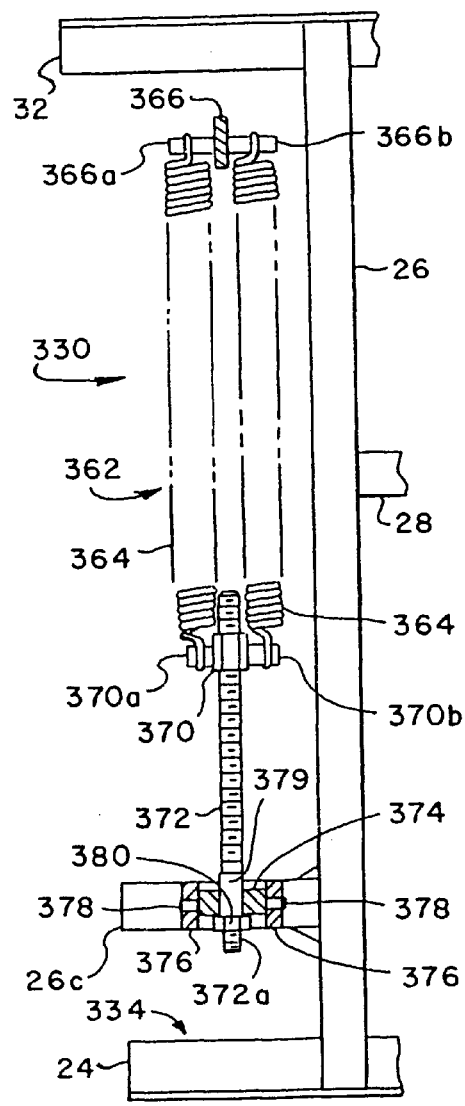
FIG. 16 is a view taken generally from the line 16—16 of FIG. 15.
Figure 19:
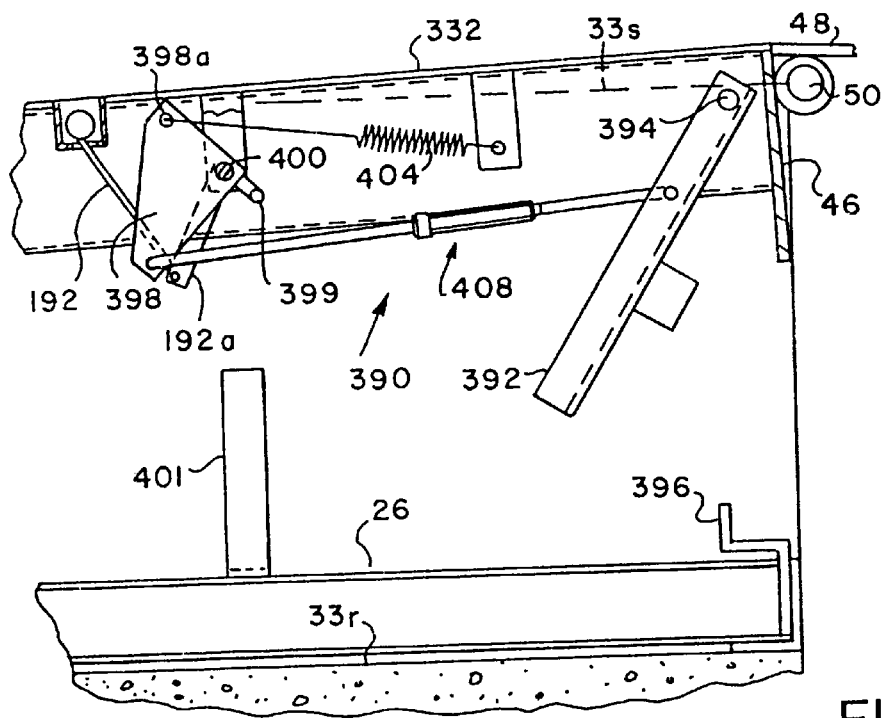

Referring further to FIG. 15, and also FIG. 16, the dock leveler apparatus 330 includes additional counterbalance spring mechanism 362 for counterbalancing at least part of the weight of the ramp 332. The counterbalance spring mechanism 362 includes two parallel coil tension springs 364 which are connected at one end to a depending lever arm 366 connected to the ramp 332. The lever arm 366 includes opposed projections 366a, FIG. 16, and 366b for supporting adjacent ends of springs 364. The opposite ends of the springs 364 are connected to a bracket comprising a threaded nut 370 and opposed arm portions 370a and 370b which are connected directly to the ends of the springs 364 as shown.

The nut 370 is threadedly engaged with an elongated spring tension adjustment screw 372 which is supported in a bearing block 374 supported between two trunnion support members 376 and which are adapted to journal opposed trunnions 378 of the bearing block 374. The screw 372 includes a generally cylindrical bearing portion 379 journaled for rotation in the bearing block 374 and having a hex nut 380 disposed on a threaded end portion 372a of screw 372. The nut 380 is also engageable with the bearing block 374 for retaining the screw 372 in the bearing block against linear displacement toward the springs 364. Nut 380 is operable to engage a shoulder, not shown, between screw portions 372a and 379. The nut 380 may be engaged by a suitable wrench for rotating the screw 372 to effect axial translation of the nut 370 to adjust the tension in the springs 364, thereby effectively changing the counterbalance effort of the springs as regards the tendency for the ramp 332 to pivot in a clockwise direction, viewing FIG. 15, about the hinge 39.

The counterbalance spring mechanism 362 is advantageously disposed adjacent one side of the frame 334. The trunnion support members 376 are suitably mounted on a support member 26c which projects laterally from a frame beam member 26. Moreover, since the counterbalance spring mechanism 362 is arranged such that the nut 380 is disposed adjacent both a lateral side of the frame near a forward edge defined by the frame member 24 good access to the screw 372 for adjusting the tension in the counterbalance springs is provided. The overall arrangement of the actuator mechanism 336 together with the counterbalance springs 361 and 364 for the apparatus 330 is advantageous in that the power requirements for the actuator are substantially reduced while the dock leveler 330 enjoys substantially all of the benefits of the dock leveler apparatus 20, for example.

Referring now to FIG. 17, the dock leveler apparatus 20, 220 or 330 may be adapted to include an alternate embodiment of a ramp support leg retraction mechanism illustrated in FIGS. 17 through 22. By way of example, the apparatus 330 is adapted to include a support leg retraction mechanism, generally designated by the numeral 390. Only pertinent portions of the ramp 332 and the frame 334 are shown in FIGS. 17 through 20 in the interest of clarity and conciseness. Ramp 332 includes spaced apart depending support legs 392, one shown in FIGS. 17 through 21, similar to and supported in the same manner as the support legs 170 for the apparatus 20. Each support leg 392 is mounted on ramp 332 for pivotal movement about a pivot pin 394 between the position shown in FIGS. 17 and 18 and the positions shown in FIGS. 19 and 20. Each support leg 392 is prevented from moving to a retracted position by a bracket 396 similar to the bracket 171, 171a.

Figure 21:
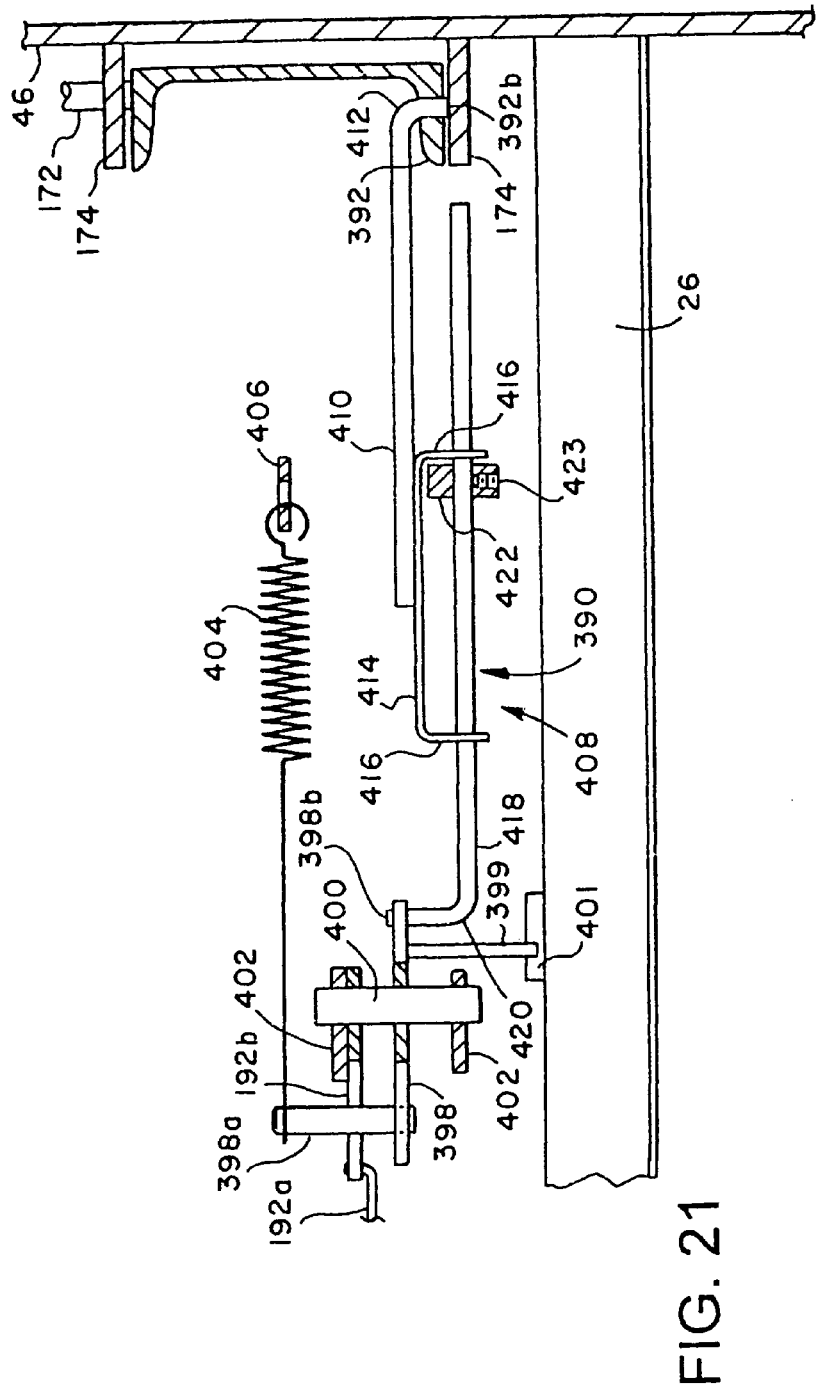
FIG. 21 is a view taken from line 21—21 of FIG. 17.

The support legs 392 are urged to the position shown in FIGS. 17 and 18 by a retraction mechanism pivot link or member 398 comprising a somewhat triangular shaped plate which is mounted for movement about a pivot pin 400 supported by spaced apart depending brackets 402 connected to the ramp 332, see FIG. 21 also. In the position shown in FIG. 17 the pivot member 398 is urged to move in a counterclockwise direction, viewing FIG. 17, by a tension coil spring 404 suitably connected at one end to the member 398 at a connection pin 398a and at its opposite end to a support bracket 406 mounted on ramp 332. The pivot member 398 is also connected to lost motion linkage means 408 extending between and connected to the pivot member and a support leg 392 at spaced apart connection points 398b and 392b, respectively.

Figure 22:
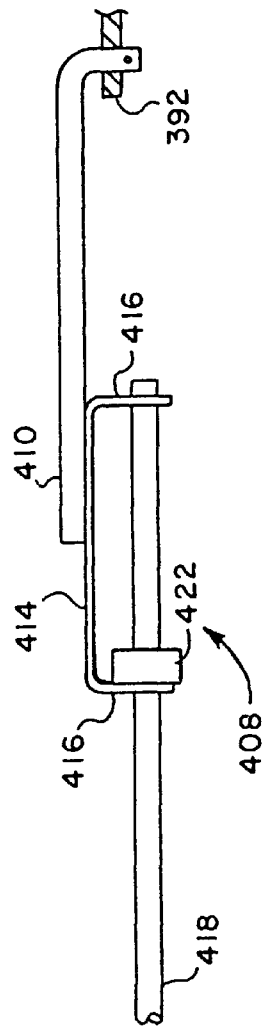
FIG. 22 is a detail view showing an alternate position of a lost motion coupling for the leg retraction mechanism shown in FIGS. 17 through 21.

Referring briefly to FIGS. 21 and 22, the lost motion linkage 408 comprises a first elongated rod 410 which has a transverse end portion 412 connected to leg 392 at connection point 392b. The opposite end of rod 410 is connected to a channel shaped bracket 414 having spaced apart flanges 416, each provided with a suitable bore therein for slidably journaling a second elongated linkage rod 418. A transverse distal end 420 of rod 418 is suitably connected to the pivot member 398 at connection point 398b, as shown in FIGS. 21 and 22. Rod 418 also includes a cylindrical collar or stop member 422 supported thereon and normally fixed against movement relative to the rod 418 but being suitably adapted to be positioned at selected locations along the rod 418. Stop member 422 may include a suitable set screw 423, FIG. 21, for securing the stop member to rod 418. Stop member 422 is movable with rod 418 between the flanges 416 from the position shown in FIG. 21 to the position shown in FIG. 22, for example. Accordingly, rod 418 may move relative to rod 410 over the distance between the flanges 416 to form a lost motion connection between the pivot member 398 and the leg 392. For example, when the leg retraction mechanism 390 is in the position shown in FIG. 17 the linkage 408 is in the position shown in FIG. 21 and when the pivot member 398 has moved to the position shown in FIG. 18 the linkage 408 has assumed the position shown in FIG. 22.

Referring further to FIGS. 17 and 18, in particular, the pivot member 398 also includes a projection 399 formed thereon which, in a certain position of the pivot member, is engageable with a post member 401 extending upward from the frame 334 and supported on one of the frame members 26, for example. The pivot member 398 is also operably connected to a manual pull ring 194 by way of a rod 192a and a link 192b journalled on the pin 400. The pull ring 194 is normally disposed in a recess 333 in the ramp 332, as illustrated. In the position of the pivot member 398 shown in FIG. 17, the spring 404 urges the pivot member to pivot about the pivot pin 400 in a counterclockwise direction to cause the linkage 408 to urge the leg 392 into its upright position for supporting the ramp 332, as shown. However, when the rod 192a is pulled link 192b engages pin 398a and moves the pivot member 398 from the position shown in FIG. 17 to the position shown in FIG. 18 whereby the direction of forces exerted by spring 404 on pivot member 398 is reversed so that the pivot member 398 is now urged to move in a clockwise direction, viewing either FIGS. 17 or 18.

Pivot member 398 moves to a limit position of the lost motion linkage 408 corresponding to the position of the linkage illustrated in FIG. 22 and exerts a biasing force on leg 392 urging the leg to pivot to a retracted position, that is, in a clockwise direction about its pivot pin 394. The projections 396 and the weight of the ramp 332 exerting a downward force on the legs 392 prevent the legs from pivoting out of a ramp supporting position. However, when the ramp 332 is raised to the position shown in FIG. 19, the legs 392 are pivoted to a retracted position, as shown as the pivot member 398 is moved further in a clockwise direction about its pivot 400. In this way when the ramp 332 is lowered to the position of FIG. 20, for example, the ramp may be moved to a below dock condition as described previously for the embodiment shown in FIG. 10.

Figure 20:
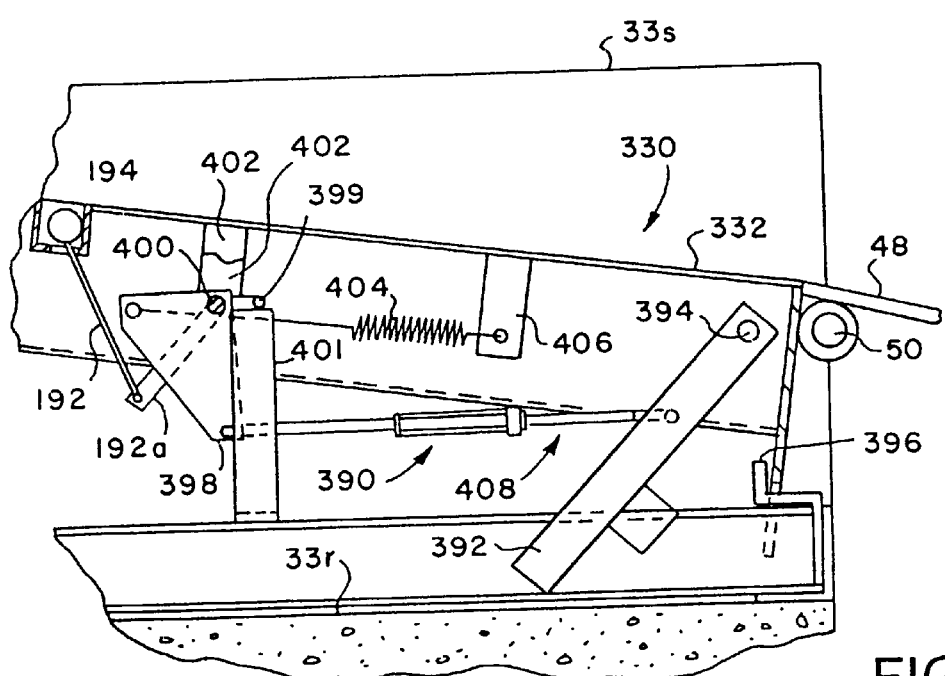

Referring further to FIG. 20, when the ramp 332 moves to the so-called below dock position shown, the projection 399 engages the distal end of post 401 to cause the pivot member 398 to move back to a position wherein the spring 404 now, again, urges the pivot member 398 to move in a counterclockwise direction, viewing FIG. 20, about its pivot pin 400. Linkage 408 moves back to the position shown in FIG. 21 and the spring 404 exerts a force through pivot member 398 and linkage 408 on leg 392 urging the leg to assume its upright support position. Accordingly, when the ramp 332 is moved upward to a position slightly above the position shown in FIG. 17, the legs 392 are pivoted back to the ramp support position whereby the ramp may then be lowered back to the position shown in FIG. 17 with the cross traffic legs in their working support position of the ramp. One advantageous aspect of the leg retraction mechanism 390 is that only one spring is required for moving the cross traffic support leg or legs 392 between their working position and a retracted position.

Figure 23:
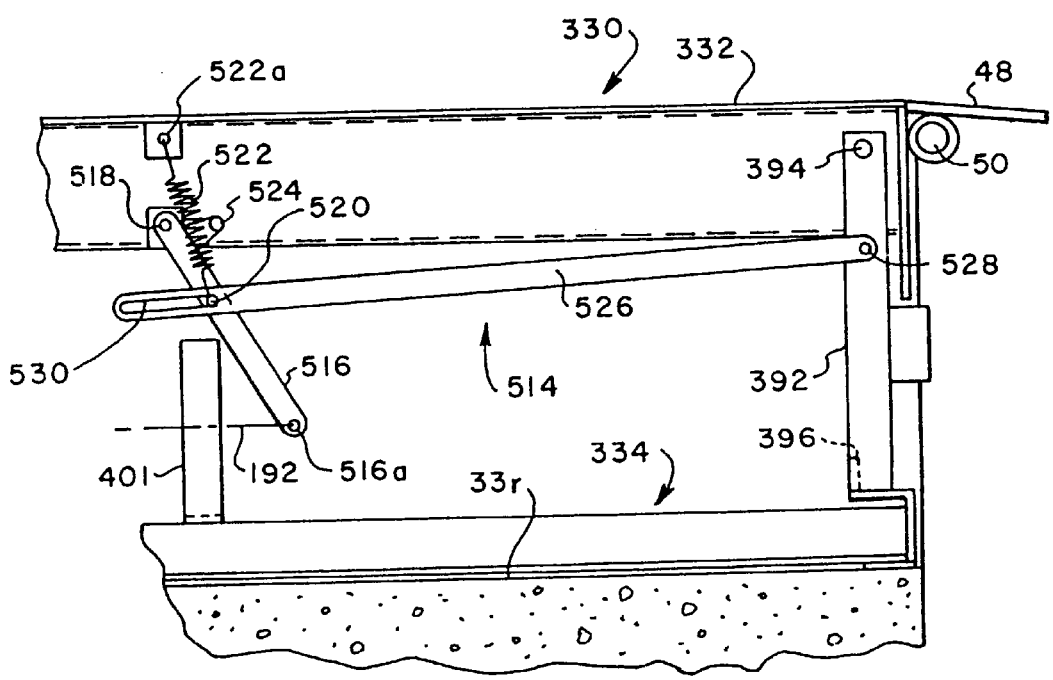
FIGS. 23 and 24 are partial side elevations of a second alternate embodiment of a ramp support leg retraction mechanism in accordance with the invention.
Figure 24:
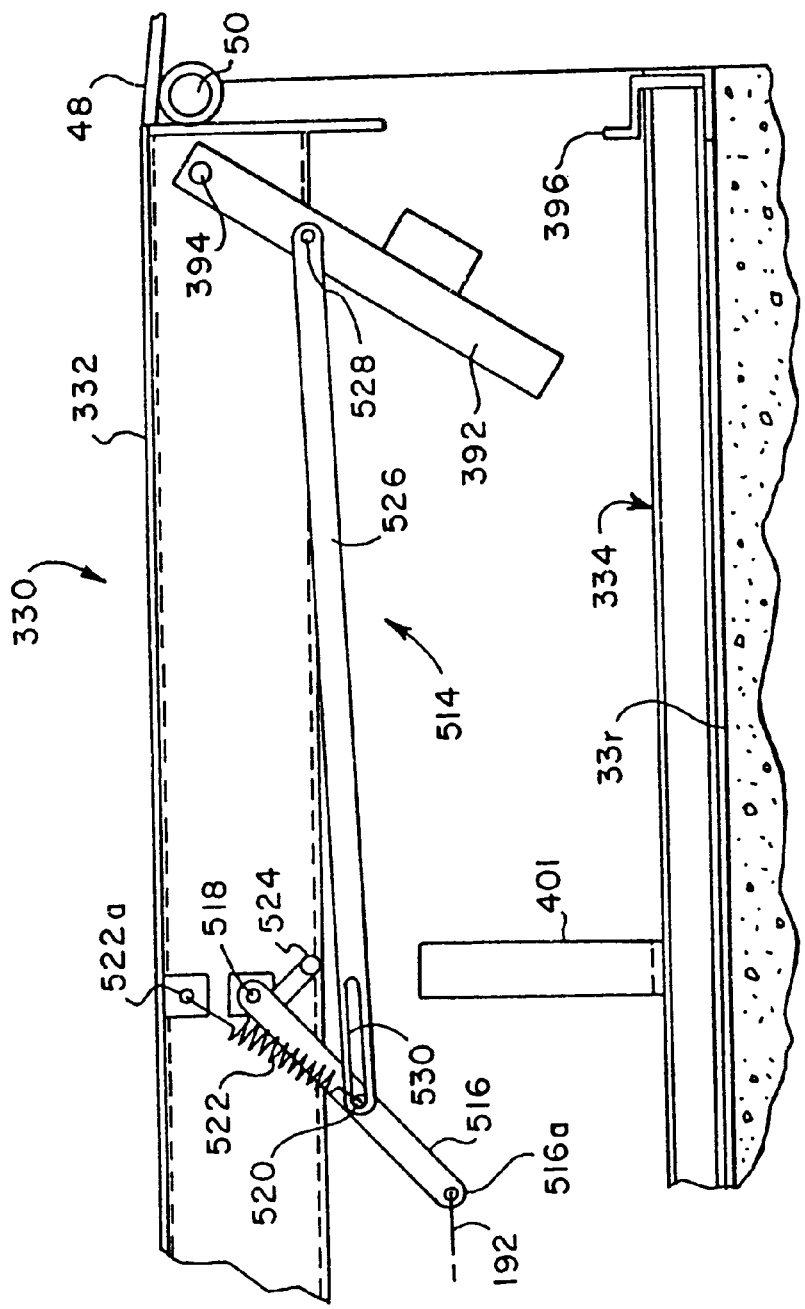

Referring now to FIGS. 23 and 24, another embodiment of a support leg retraction mechanism as illustrated and generally designated by the numeral 514. The support leg retraction mechanism 514 includes a first pivot member 516 connected to the ramp 332 at a pivot pin connection 518 for movement in clockwise and anticlockwise directions, viewing FIGS. 23 and 24, respectively. The pivot member 516 is provided with a pin 520 supported thereon and projecting laterally therefrom between the pivot pin 518 and a distal end 516a. A coil tension spring 522 is connected at one end to the member 516, preferably at the pin 520, and the opposite end of the spring 522 is connected to the ramp 332 at a connection point 522a. A lateral projection 524 is supported on the member 516 spaced from the pivot pin 518 but between the pin 518 and the pin 520.

The leg retraction mechanism 514 also includes an elongated link 526 pivotally connected by a pivot pin 528 to one of the legs 392 at one end of the link. Link 526 also includes, adjacent its opposite end, an elongated slot 530 which receives the pin 520 to form a lost motion connection between the member or link 516 and link 526.

Viewing FIGS. 23 and 24, it will be noted that, in the position of the links 516 and 526 shown in FIG. 23, the spring 522 urges the link 516 to move in a counterclockwise direction, viewing the drawing figure, about pivot pin 518 and thus forces the pin 520 into engagement with the link 526 at one end of the slot 530 urging the link 526 to move the ramp support leg 392 into the position shown in supportive relationship to the ramp 332. However, in response to moving the link 516 from the position shown in FIG. 23 to the position shown in FIG. 24 the pin 520 is moved to the opposite end of slot 530 and, upon raising the ramp to a position where the legs 392 clear the brackets 396, the spring 522, which has moved "over center" with respect to the pivot pin 518, now urges the link 516 to move in a clockwise direction about the pivot pin 518 to retract the leg to the position shown in FIG. 24. The ramp 332 may then be moved to a below dock level position similar to the position shown in FIG. 20.

When the ramp 332 is moved to the below dock level position, such as shown for the previous embodiment of retraction mechanism in FIG. 20, the projection 524 is operable to engage the distal end of post 401 to move the link 516 back to a position wherein the spring 522 again urges the link 516 to move in a counterclockwise direction thus urging the link 526 and the legs 392 to move back to the ramp supporting position of the legs. Thus, the leg retraction mechanism 514 operates in a manner similar to the leg retraction mechanism 390 and requires only one spring for urging the ramp support legs to be in a working position and a retracted position, depending on the position of link 516.

Those skilled in the art will appreciate, viewing FIGS. 23 and 24, that the positions of the links 516, 526, the projection 524, the spring 522 and the post 401 may be arranged such that the movement of these members between their working positions may be accomplished by predetermined proportions of these elements and their positions on the ramp 332 and the frame 334.

It is believed that the embodiments of the dock leveler described hereinabove may be constructed and operated by one skilled in the art based on the description herein. The dock levelers 20, 220 and 330 and the mechanisms described herein may be constructed using conventional engineering materials for such apparatus and the operation of each embodiment, including the embodiments of the linear actuators and the leg retraction mechanisms, is believed to be understandable to those of ordinary skill in the art based on the foregoing description.

Although preferred embodiments of the invention have been described in detail herein, those skilled in the art will also appreciate that the invention may be practiced with various substitutions and modifications without departing from the scope and spirit of the appended claims.

What is claimed is:

1. A dock leveler for forming a path between a loading dock and a loadbed of a vehicle for transferring cargo therebetween, including:
   a frame;
   a generally planar ramp including hinge means for pivotally moving said ramp from a generally horizontal storage position to an elevated position about said hinge means; and
   an actuator operably connected to said ramp and including a drive motor drivingly connected to a linearly extensible member for causing said ramp to move to an elevated position, a first guide tube operably connected to said linearly extensible member and said ramp and operable to permit movement of said ramp in opposite directions without imposing actuator driving forces on said drive motor, said actuator includes a rotatable screw operably connected to said drive motor and engaged with a nut connected to said linearly extensible member disposed between said screw and said ramp, said linearly extensible member being disposed in said first guide tube in telescoping sleeved relationship for moving said ramp to an elevated position in response to rotation of said screw, and a second guide tube connected to said actuator and disposed in sleeved relationship around said screw and said first guide tube.

2. The dock leveler set forth in claim 1 including:
   a counterbalance spring disposed in sleeved relationship around one of said guide tubes for urging said ramp to move to an elevated position, and means for retaining said guide tubes engaged with each other.

3. A dock leveler for forming a path between a loading dock and a loadbed of a vehicle, comprising:
   a generally planar ramp member disposed for movement between a storage position and a position for engagement with a vehicle loadbed;
   an actuator connected to said ramp member and including a reversible electric drive motor drivingly connected to one of an elongated rotatable screw member and a nut member, a linearly extensible member connected to the other of said screw member and said nut member and responsive to operation of said motor to move in one direction to move said ramp to an elevated position, said linearly extensible member being responsive to rotation of said one of said screw member and said nut member to move in an opposite direction to a retracted position, and an elongated tubular member operably engaged with said linearly extensible member in telescoping relationship and operable to allow floating motion of said ramp in opposite directions in response to movement of said loadbed when said linearly extensible member is in said retracted position without imposing driving forces on said motor through said nut member and said screw member; and
   a control circuit for energizing said motor to move said linearly extensible member in opposite directions.

4. The dock leveler set forth in claim 3 wherein:
   said actuator includes a counterbalance spring disposed in sleeved relationship over said tubular member for biasing said ramp toward an elevated position.

5. The dock leveler set forth in claim 4 wherein:
   said linearly extensible member is operably engaged with said tubular member by a cooperable pin member to prevent rotation of said linearly extensible member and said nut relative to said tubular member.

6. A dock leveler comprising:
   a ramp supported for movement between a storage position and an elevated position;
   an actuator connected to said ramp and including a motor operably connected to a linearly extensible and retractable member for moving said ramp to said elevated position; and
   a control circuit for operating said motor to extend said linearly extensible member to move said ramp to said elevated position and for operating said motor to retract said linearly extensible member, said control circuit including a timer operable to effect de-energizing said motor on retraction of said linearly extensible member, a switch including an actuating member for said switch, said switch being movable to a first position by said actuating member to operate said motor to extend said linearly extensible member to move said ramp toward said elevated position, and, upon release of said actuating member, move to a second position to cause said motor to operate to retract said linearly extensible member, the movement of said switch to said second position being effective to cause said timer to de-energize said motor after a predetermined time period commencing with movement of said switch to said second position.

7. A dock leveler for forming a path between a loading dock and a loadbed of a vehicle for transferring cargo therebetween, including:

a frame;

a generally planar ramp including hinge means for pivotally moving said ramp from a generally horizontal storage position to an elevated position about said hinge means; and an actuator operably connected to said ramp and including a reversible rotary drive motor drivingly connected to a linearly extensible member by way of cooperable screw and nut members and operable to extend said linearly extensible member to move said ramp to an elevated position, said drive motor being reversible to retract said linearly extensible member, and an elongated link pivotally connected at one end to said linearly extensible member and operable upon retraction of said linearly extensile member to permit floating movement of said ramp in opposite directions about said hinge means without imposing actuator driving forces on said drive motor.

8. The dock leveler set forth in claim 7 wherein:

said link is pivotally connected to said ramp at another end of said link.

9. A dock leveler for forming a path between a loading dock and a load bed of a vehicle for transferring cargo therebetween, said dock leveler including:

a frame;

a generally planar ramp including hinge means for pivotally moving said ramp from a generally horizontal storage position to an elevated position about said hinge means; and an actuator operably connected to said ramp and including a drive motor drivably connected to an elongated screw member, a nut engaged with said screw member and with an elongated linearly extensible member operable to effect moving said ramp from said storage position to said elevated position in response of rotation of said screw member by said motor, control means for operating said motor to rotate said screw member in one direction to extend said linearly extensible member to move said ramp to an elevated position and to rotate said screw member in an opposite direction to move said linearly extensible member to a retracted position, and an elongated guide member operably connected to said actuator in telescoping relationship with said linearly extensible member to allow floating motion of said ramp in opposite directions about said hinge means when said linearly extensible member is in said retracted position.

10. The dock leveler set forth in claim 9 wherein:

said guide member comprises an elongated tubular member disposed in telescoping sleeved relationship over said linearly extensible member.

* * * * *